United States Patent
Sato

(10) Patent No.: US 7,980,349 B2
(45) Date of Patent: Jul. 19, 2011

(54) DRIVE SYSTEM FOR VEHICLE

(75) Inventor: Tomohiro Sato, Toyoake (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 336 days.

(21) Appl. No.: 12/136,571

(22) Filed: Jun. 10, 2008

(65) Prior Publication Data

US 2008/0302590 A1    Dec. 11, 2008

(30) Foreign Application Priority Data

Jun. 11, 2007  (JP) ................................. 2007-154088

(51) Int. Cl.
*B60K 17/356* (2006.01)
(52) U.S. Cl. ......................... 180/242; 180/245; 180/246
(58) Field of Classification Search .................. 180/242, 180/245, 246
See application file for complete search history.

(56) References Cited

U.S. PATENT DOCUMENTS

| | | | |
|---|---|---|---|
| 5,495,906 A * | 3/1996 | Furutani .................... | 180/65.23 |
| 6,908,411 B2 * | 6/2005 | Shimizu et al. .................. | 477/5 |
| 7,044,255 B2 * | 5/2006 | Maeda et al. .................. | 180/242 |
| 7,216,943 B2 * | 5/2007 | Nishikawa et al. ............ | 303/152 |
| 7,455,133 B2 * | 11/2008 | Kaneko et al. ........... | 180/65.285 |
| 7,533,754 B2 * | 5/2009 | Burrows et al. ................ | 180/248 |
| 2001/0042649 A1 * | 11/2001 | Maeda et al. ................ | 180/65.4 |
| 2003/0216215 A1 * | 11/2003 | Suzuki et al. ..................... | 477/5 |
| 2005/0121248 A1 * | 6/2005 | Ushiroda et al. ............. | 180/248 |
| 2006/0108166 A1 * | 5/2006 | Tanaka et al. ................. | 180/248 |
| 2006/0196714 A1 * | 9/2006 | Sugimoto et al. ............. | 180/242 |
| 2007/0193808 A1 * | 8/2007 | Perakes et al. ................ | 180/242 |

FOREIGN PATENT DOCUMENTS

JP         2005-178479 A      7/2005

* cited by examiner

*Primary Examiner* — Joanne Silbermann
*Assistant Examiner* — Michael R Stabley
(74) *Attorney, Agent, or Firm* — Buchanan Ingersoll & Rooney PC

(57) ABSTRACT

A drive system for a vehicle includes a motor, an internal combustion engine, a generator, a power distribution mechanism distributing a driving force of the internal combustion engine to driving wheels and the generator, an electronic control unit controlling the motor and the internal combustion engine, and rotation members connected to first driving wheels constituted by one of front wheels and rear wheels and including an output element of the power distribution mechanism, wherein the internal combustion engine driving the first driving wheels via the power distribution mechanism, the motor driving second driving wheels not driven by the internal combustion engine, the rotation members are driven by the internal combustion engine.

12 Claims, 27 Drawing Sheets

| Running mode | Front wheels | | Rear wheels | Remarks |
|---|---|---|---|---|
| | Engine | MG1 | MG2 | |
| Forward acceleration | Operated | Power generation | Traction | Motor state |
| | | Forward rotation | Forward rotation | Rotation direction |
| | Forward | | Forward | Driving Force direction |

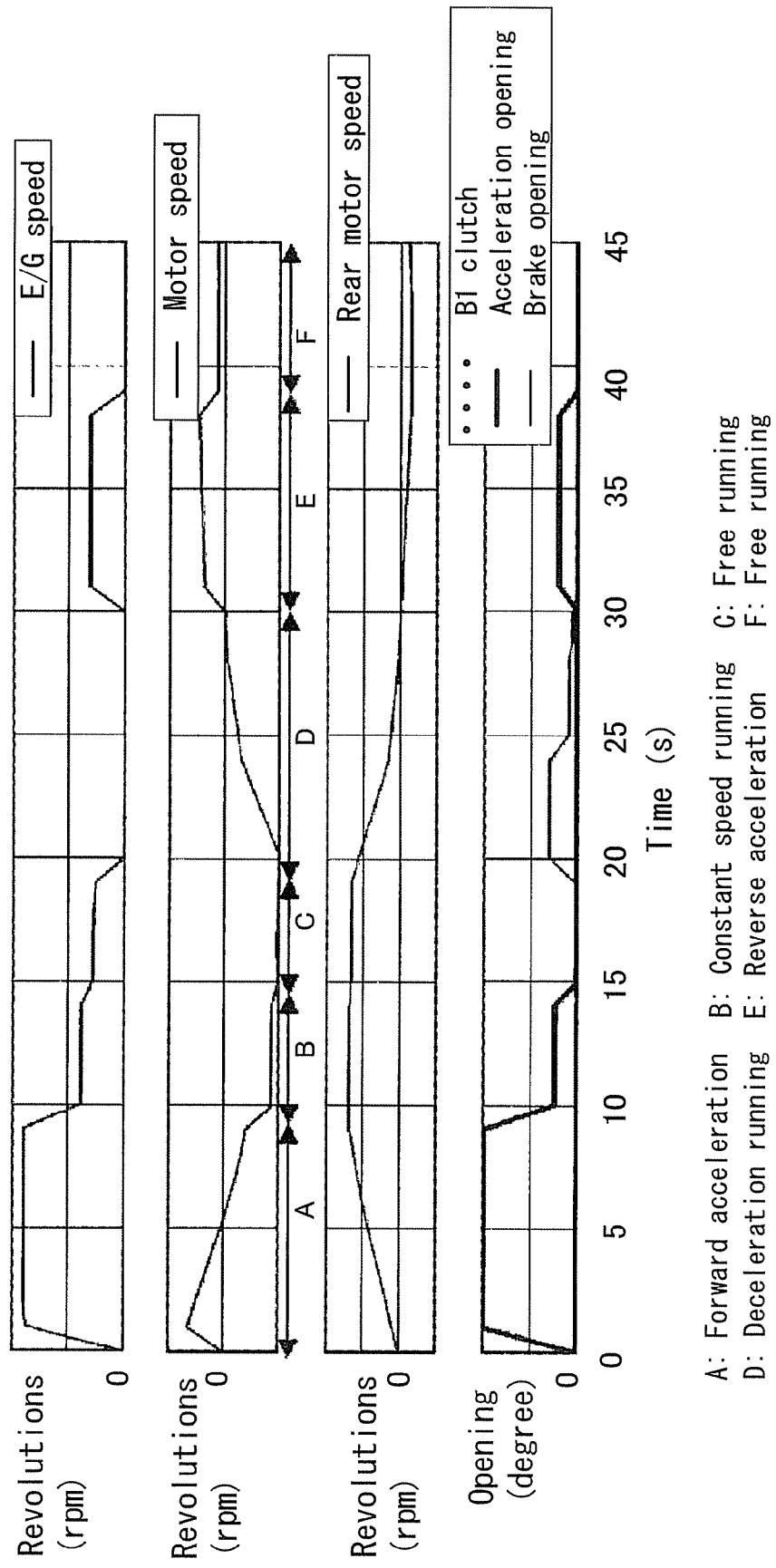

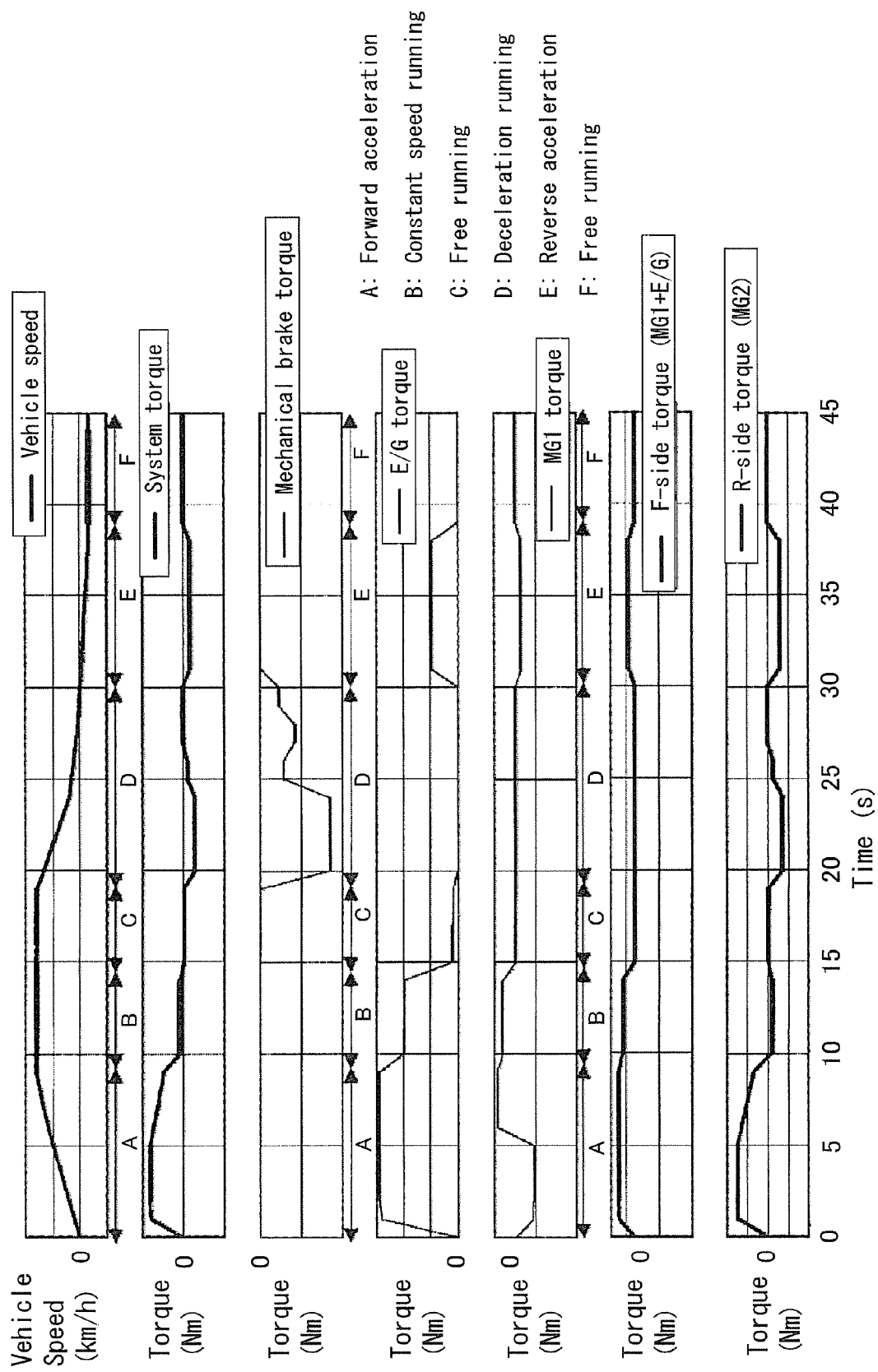

| Running mode | Front wheels | | | Rear wheels | Remarks |
|---|---|---|---|---|---|
| | Engine | MG1 | | MG2 | |
| Deceleration Running (at regeneration) | Stopped | Regeneration | | Regeneration | Motor state |
| | | Reverse rotation | | Forward rotation | Rotation direction |
| | Reverse | | | Reverse | Driving Force direction |

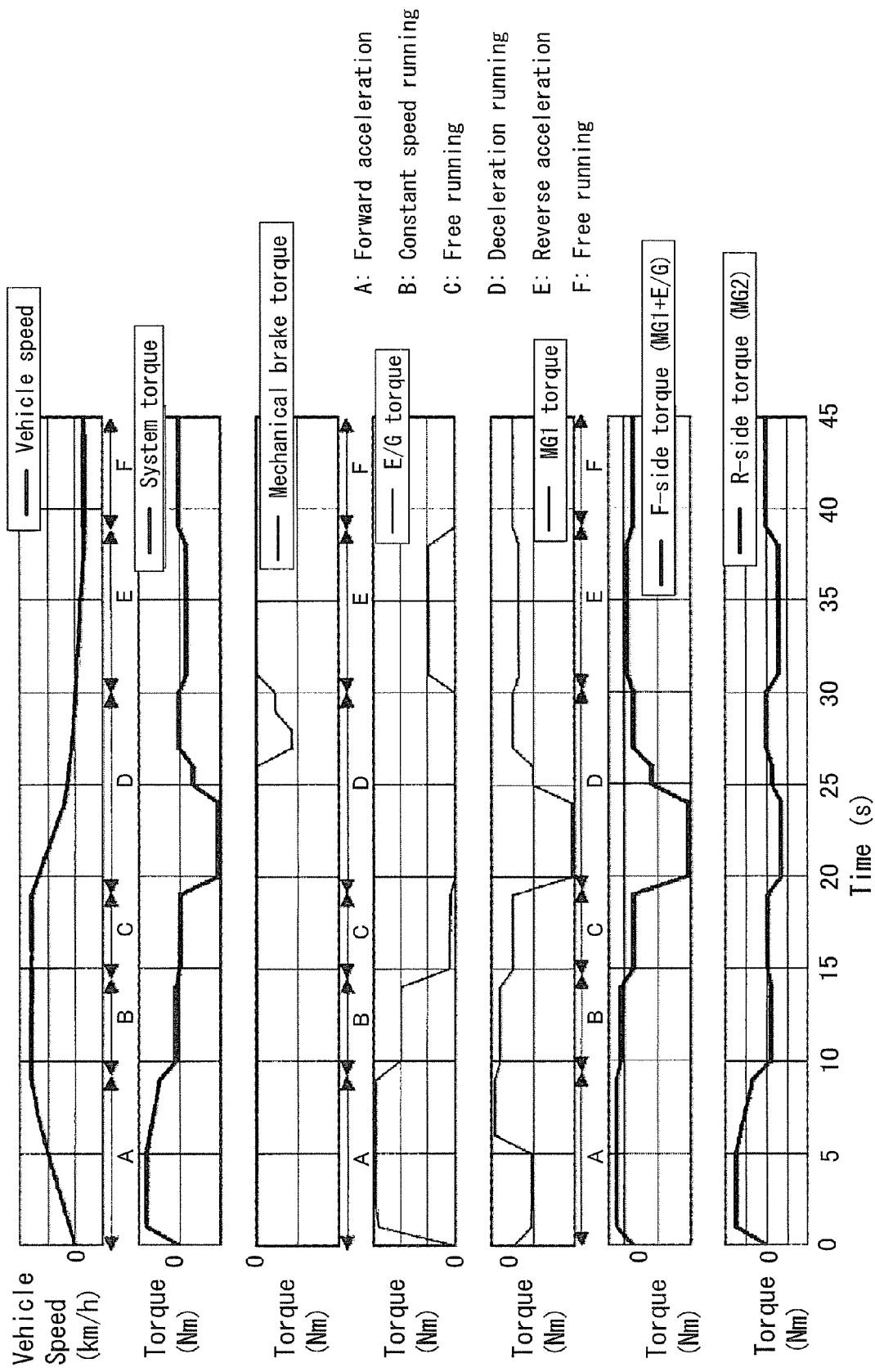

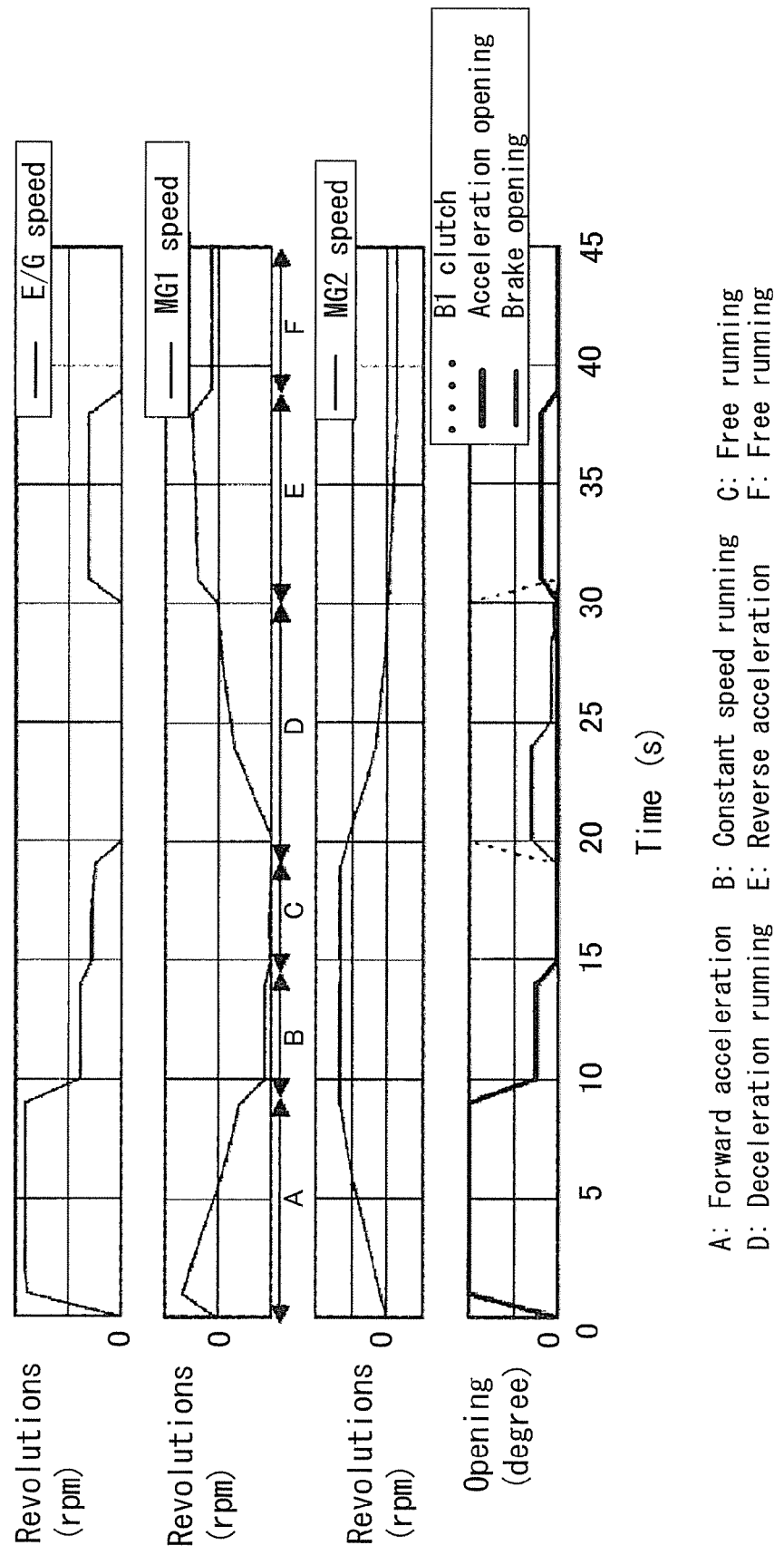

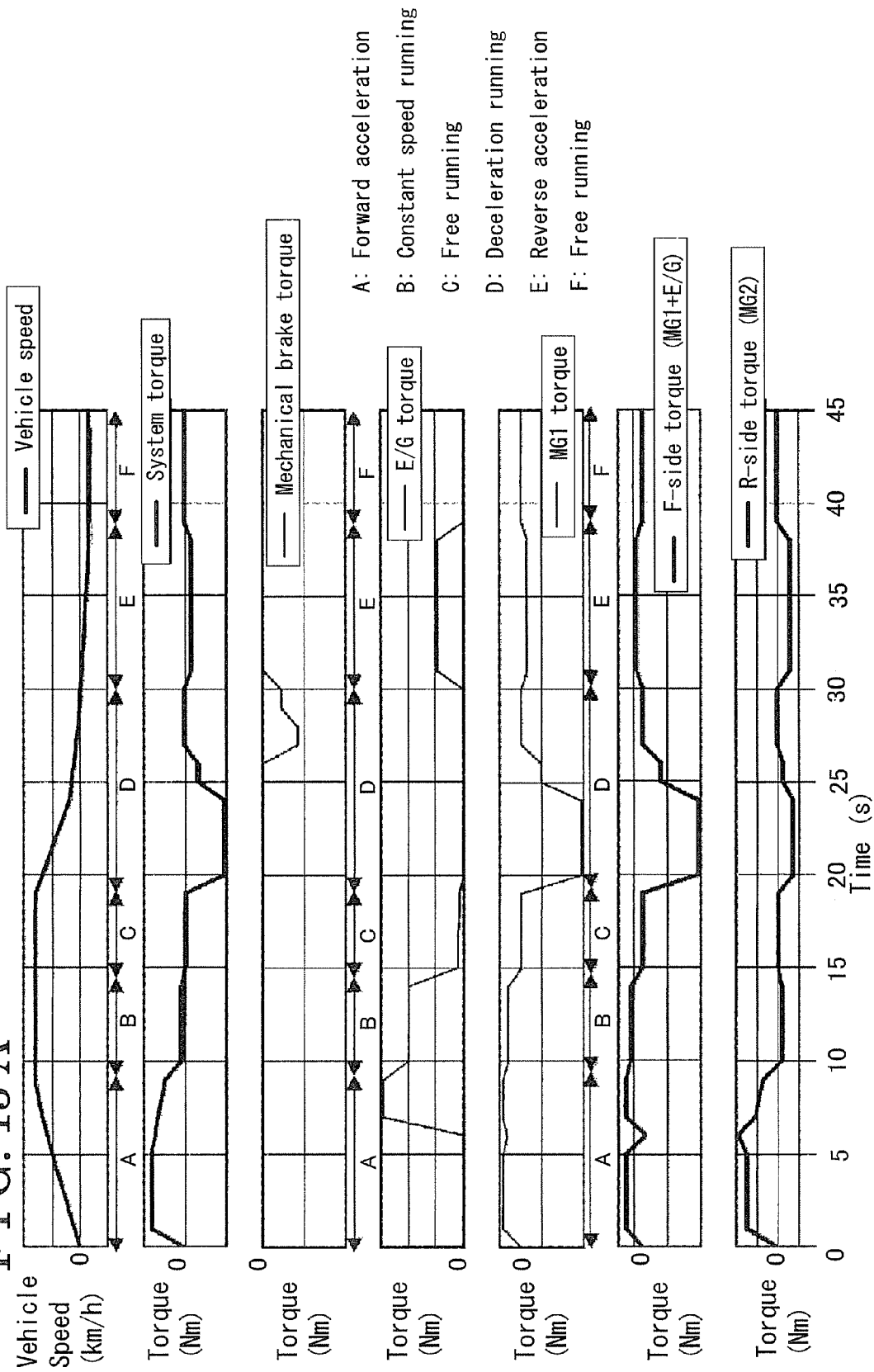

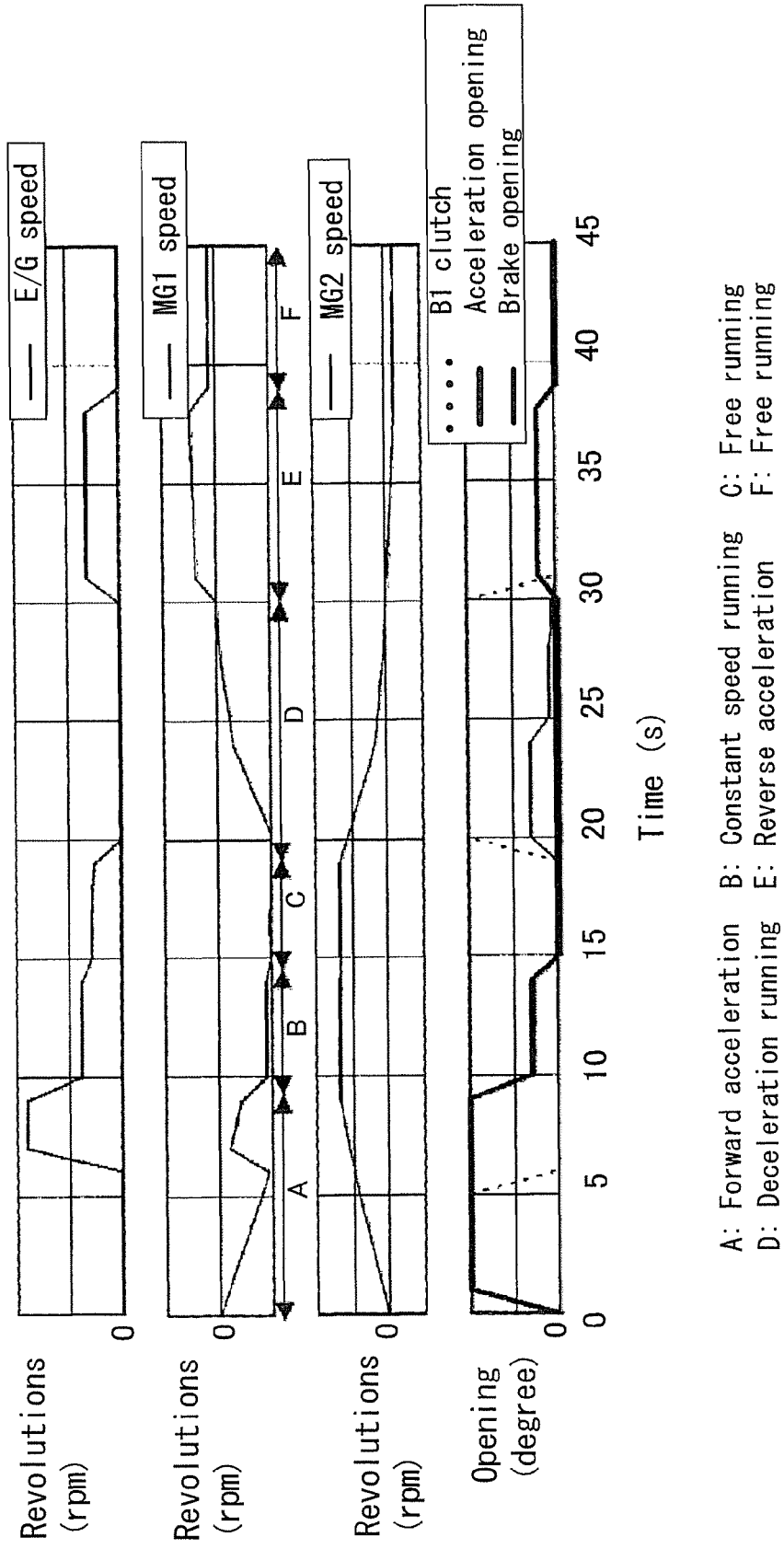

F I G. 22
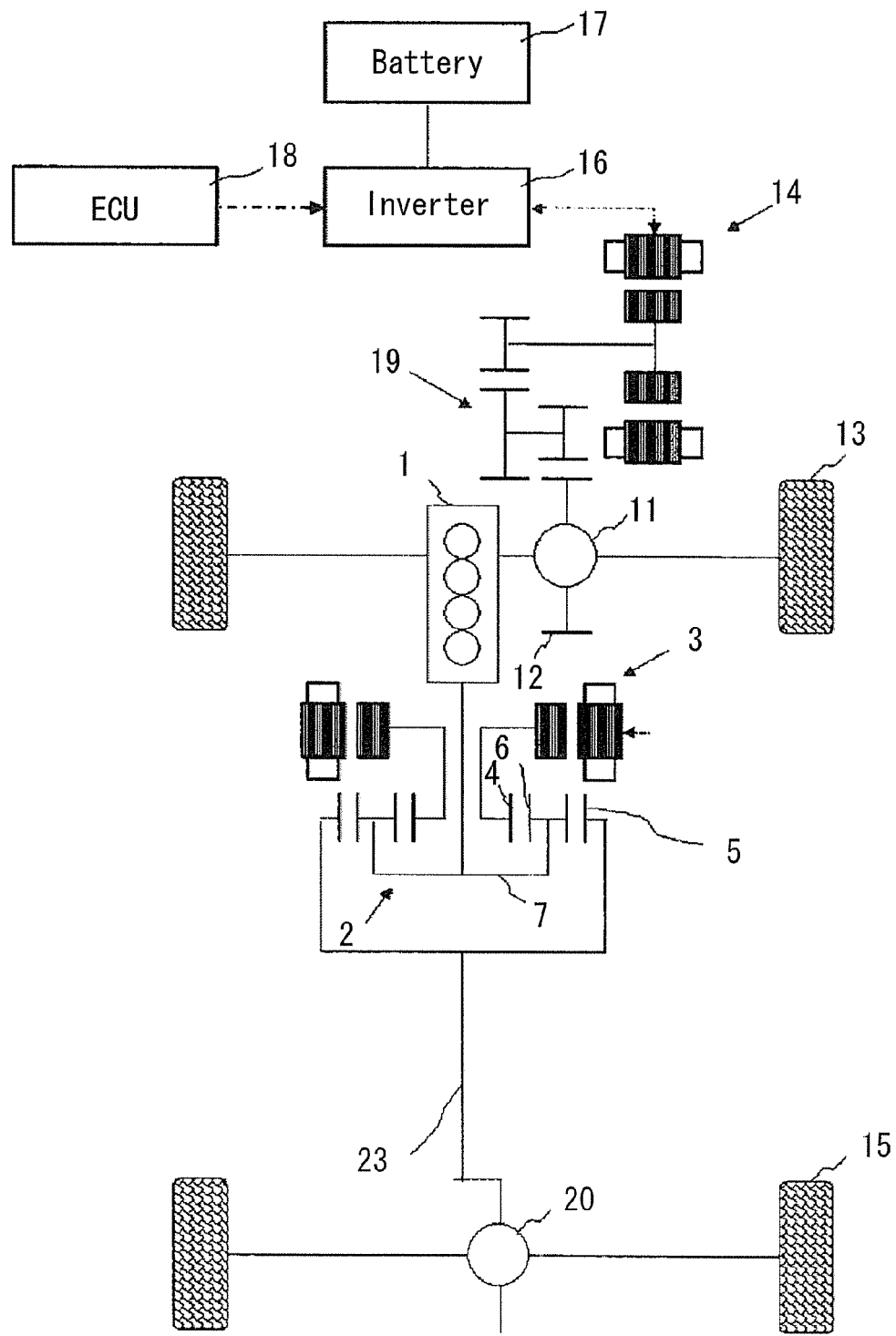

US 7,980,349 B2

DRIVE SYSTEM FOR VEHICLE

CROSS REFERENCE TO RELATED APPLICATIONS

This application is based on and claims priority under 35 U.S.C. §119 to Japanese Patent Application No. 2007-154088, filed on Jun. 11, 2007, the entire content of which is incorporated herein by reference.

FIELD OF THE INVENTION

This invention generally relates to a drive system for a vehicle. More particularly, the invention pertains to a drive system for a vehicle that achieves a four-wheel-drive running by using a driving force of an internal combustion engine and a driving force of a motor.

BACKGROUND

Known power output apparatus for a vehicle including a power distribution mechanism for distributing a drive force of an internal combustion engine to driving wheels and an electric generator is disclosed in JP2005178479A (Reference 1). The power distribution mechanism of the disclosed power output apparatus is constituted by a planetary gear mechanism that includes a sun gear connected to a rotor of a motor generator, a ring gear serving as an output element and arranged concentrically to the sun gear, and a pinion gear engaging with both of the sun gear and the ring gear and moves around the sun gear in addition to rotating on its axis by means of a carrier connected to an output shaft of the internal combustion engine. Further, a permanent magnet motor is connected to the ring gear for assisting a drive torque. According to such structure, energy regeneration is performed by the generator and a continuous speed variation is achieved through a change of each speed of the internal combustion engine and the permanent magnet motor.

However, when considering a four-wheel-drive feature realized by a vehicle not equipped with a transmission according to the aforementioned Reference 1, for example, two motors are required, which leads to increases in cost and weight, and a deterioration of space efficiency.

According to the Reference 1, a motor not formed by a permanent magnet is connected to a rear axle for realizing a four-wheel drive vehicle. That is, a combination of two motors, one motor generator, and an inverter are inevitable. The motor (i.e., permanent magnet motor) connected to front wheels exchanges a torque with the ring gear serving as the output element. At this time, the ring gear functions as a drive gear. Further, the motor not formed by the permanent magnet and connected to rear wheels exchanges a torque with the rear wheels to thereby achieve a hybrid system. According to such structure in which the two motors are connected to each of driving wheels (i.e., front wheels and rear wheels) without a clutch, a rotor of the motor is brought to rotate even when it is not required, which results in an increase of energy loss (loss torque).

A need thus exists for a drive system for a vehicle which is not susceptible to the drawback mentioned above.

SUMMARY

According to an aspect of the present invention, a drive system for a vehicle includes a motor, an internal combustion engine, a generator, a power distribution mechanism distributing a driving force of the internal combustion engine to driving wheels and the generator, an electronic control unit controlling the motor and the internal combustion engine, and rotation members connected to first driving wheels constituted by one of front wheels and rear wheels and including an output element of the power distribution mechanism, wherein the internal combustion engine driving the first driving wheels via the power distribution mechanism, the motor driving second driving wheels not driven by the internal combustion engine, the rotation members being driven by the internal combustion engine.

BRIEF DESCRIPTION OF THE DRAWINGS

The foregoing and additional features and characteristics of the present invention will become more apparent from the following detailed description considered with reference to the accompanying drawings, wherein:

FIGS. 6A and 6B are diagrams each illustrating a state transition of each portion of the vehicle when the vehicle with a four-wheel-drive feature runs in a predetermined pattern according to a conventional drive system for a vehicle;

FIGS. 7A and 7B are diagrams each illustrating a state transition of each portion of the vehicle when the vehicle runs in the predetermined pattern according to the first embodiment of the present invention;

FIGS. 12A and 12B are diagrams each illustrating a state transition of each portion of the vehicle when the vehicle runs in a predetermined running pattern according to the second embodiment of the present invention;

FIGS. 15A and 15B are diagrams each illustrating a state transition of each portion of the vehicle when the vehicle runs in a predetermined running pattern according to the third embodiment of the present invention;

FIG. 22 is still another modified structural view of the drive system for a vehicle.

DETAILED DESCRIPTION

Figure 1:
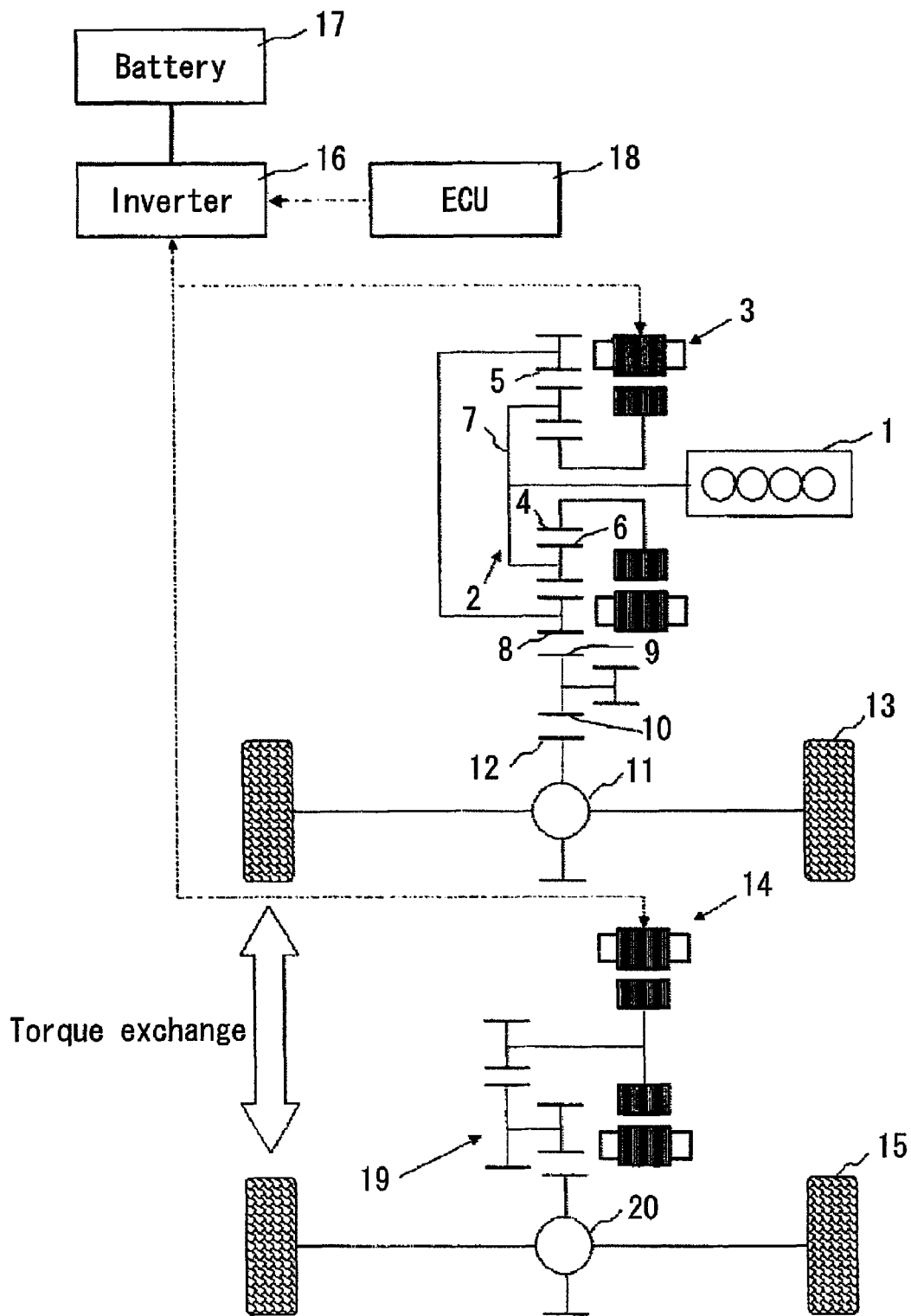
FIG. 1 is a structural view of a drive system for a vehicle according to a first embodiment of the present invention.

FIG. 1 illustrates a structure of a drive system for a vehicle according to a first embodiment of the present invention. As illustrated in FIG. 1, the drive system includes a power distribution mechanism 2 for distributing an output torque of an internal combustion engine 1 such as a gasoline engine, a diesel engine, and a gas engine to a motor generator 3 functioning as an electric generator and to an output side such as an output gear 8 to be mentioned later.

The motor generator 3 is constituted by a permanent magnetic synchronous motor, for example. The motor generator 3 transmits a reaction torque when functioning as a generator and transmits a drive torque when functioning as a motor to the power distribution mechanism 2. A stator equipped with a coil of the motor generator 3 is secured by a casing (not shown), for example.

The power distribution mechanism 2 is constituted by a single pinion planetary gear mechanism including a sun gear 4, a ring gear 5, a pinion gear 6, and a carrier 7. The sun gear 4 serving as an external gear and the ring gear 5 serving as an internal gear are arranged in a concentric manner. The pinion gear 6 engaging with both of the sun gear 4 and the ring gear 5 moves around the sun gear 4 in addition to rotating on its axis by means of the carrier 7 connected to an output shaft of the internal combustion engine 1.

The sun gear 4 is connected to a rotor of the motor generator 3 to thereby function as a reaction element (or a fixed element when the motor generator 3 is stopped). In addition, the output gear 8 is integrally formed at the ring gear 5 so as to engage with a counter driven gear 9. Further, a counter drive gear 10 integrally and coaxially formed at the counter driven gear 9 engages with a ring gear 12 of a differential 11

The drive system according to the first embodiment also includes a motor generator 14 connected to a rear axle and serving as a traction and regeneration mechanism, in addition to the aforementioned power transmission system provided at front wheels 13. An output shaft of the motor generator 14 is connected to a rear differential 20 via a deceleration gear unit 19 so as to drive rear wheels 15. The motor generator 14 may be constituted by a permanent magnetic synchronous motor in the same way as the motor generator 3 or by a motor not formed by a permanent magnet.

Accordingly, four wheels provided at front and rear of the vehicle are driven by a driving of the internal combustion engine 1 and the motor generator 14. At this time, a driving force distribution is appropriately controlled between the front wheels 13 and the rear wheels 15. For example, at a time of a start of the vehicle, the driving force is more distributed to the rear wheels than the front wheels to thereby improve a start acceleration performance of the vehicle. On the other hand at a time of constant speed running or in a high-speed area where the acceleration is small, the driving force is more distributed to the front wheels than the rear wheels to thereby improve a controlling stability of the vehicle.

The motor generators 3 and 14 are connected to a battery 17 via an inverter 16 that is controlled by an electronic control unit (ECU) 18 so that each of the motor generators 3 and 14 is switched between a traction state (motor), a power generation state (generator), and a regenerative state (generator).

Figure 2:
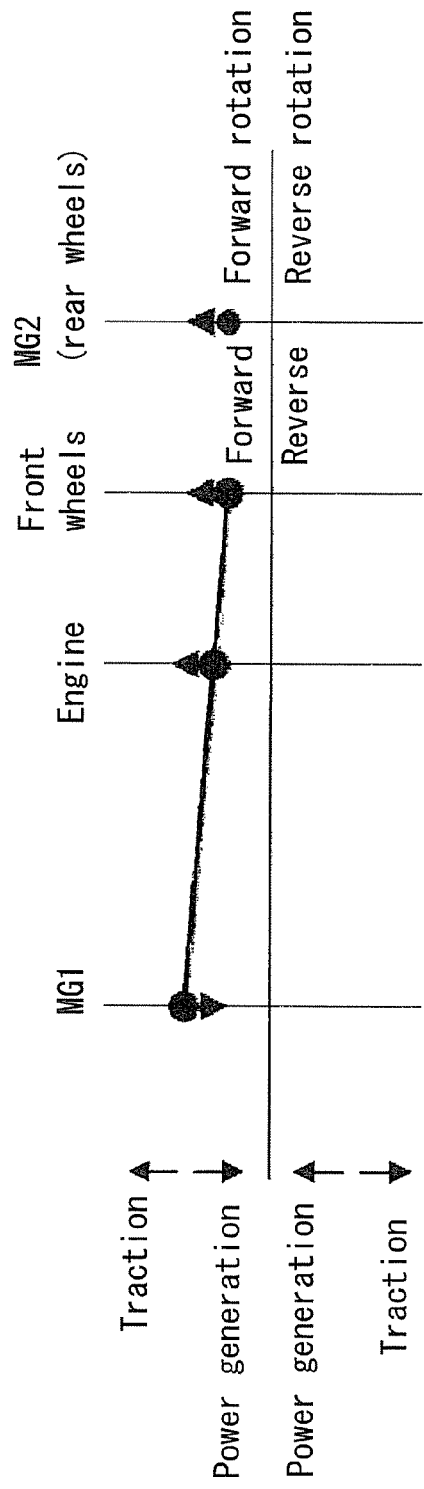
FIG. 2 illustrates a table (upper side) indicating each operating state of an engine and motors, and a nomographic chart (lower side) at a time of forward acceleration of the vehicle according to the first embodiment of the present invention.
Figure 3:
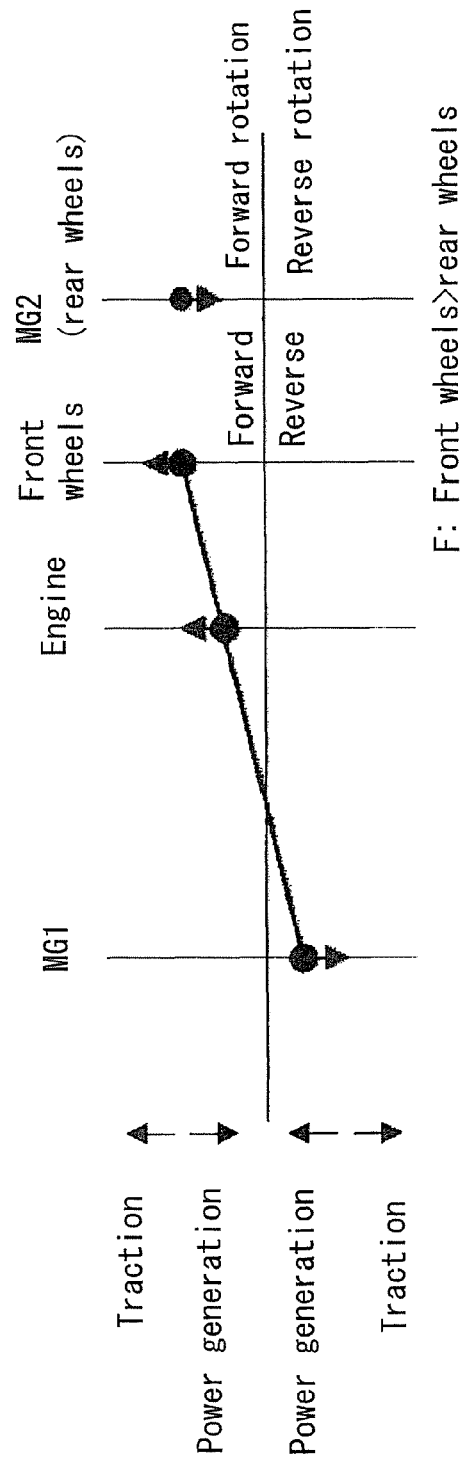
FIG. 3 illustrates a table (upper side) indicating each operating state of the engine and the motors, and a nomographic chart (lower side) at a time of constant speed running of the vehicle according to the first embodiment of the present invention.
Figure 4:
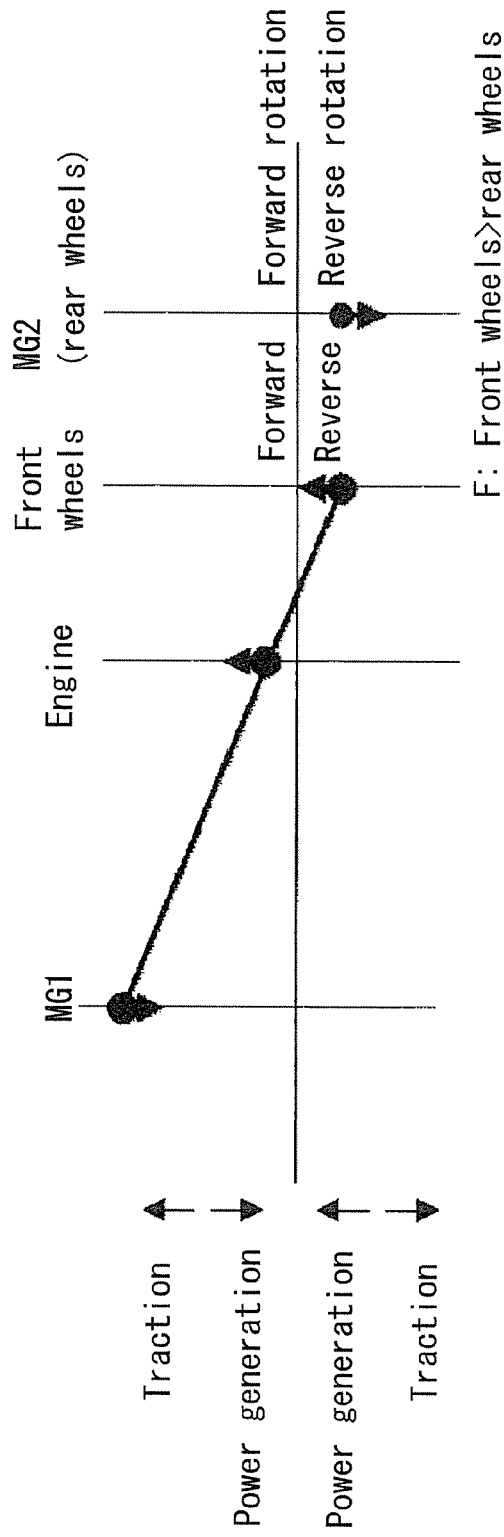
FIG. 4 illustrates a table (upper side) indicating each operating state of the engine and the motors, and a nomographic chart (lower side) at a time of reverse acceleration of the vehicle according to the first embodiment of the present invention.

Next, operating states of the internal combustion engine 1, and the motor generators 3 and 14 in each running mode of the vehicle achieved by the ECU 18 will be explained below. In FIGS. 2 to 4, the internal combustion engine 1 will be referred to as an engine, and the motor generators 3 and 14 are referred to as MG1 and MG2, respectively.

FIG. 2 illustrates a table (upper side) indicating each operating state of the engine, MG1, and MG2, and a nomographic chart (lower side) at a time of forward acceleration of the vehicle. As illustrated in FIG. 2, when the vehicle is in the forward acceleration running state, the MG2 is in the traction state for driving the rear wheels 15 in the forward direction. At this time, the engine is controlled so that optimal energy consumption is achieved with consideration of a reaction torque applied to the sun gear 4. The power generation is performed at the MG1 that rotates in the forward direction by means of the power distribution mechanism 2.

FIG. 3 illustrates a table (upper side) indicating each operating state of the engine, MG1, and MG2, and a nomographic chart (lower side) at a time of constant speed running of the vehicle. As illustrated in FIG. 3, in cases where the vehicle is in the constant running state, the front and rear wheels 13 and 15 are mainly driven by the engine. The MG2 is in the power generation state. In this case, the engine and the MG1 are controlled so that a driving force F applied to the front wheels 13 (i.e., forward driving force) far exceeds a driving force F applied to the rear wheels 15 (i.e., reverse driving force).

FIG. 4 illustrates a table (upper side) indicating each operating state of the engine, MG1, and MG2, and a nomographic chart (lower side) at a time of reverse acceleration of the vehicle. As illustrated in FIG. 4, the MG2 is in the traction state so as to rotate in the reverse direction to thereby drive the rear wheels 15 in the reverse direction. At this time, the engine is controlled so that the driving force F applied to the rear wheels 15 (i.e., reverse driving force) far exceeds the driving force F applied to the front wheels 13 (i.e., forward driving force). In addition, the power generation is performed at the MG1 in response to an increase of the engine output.

Figure 5:
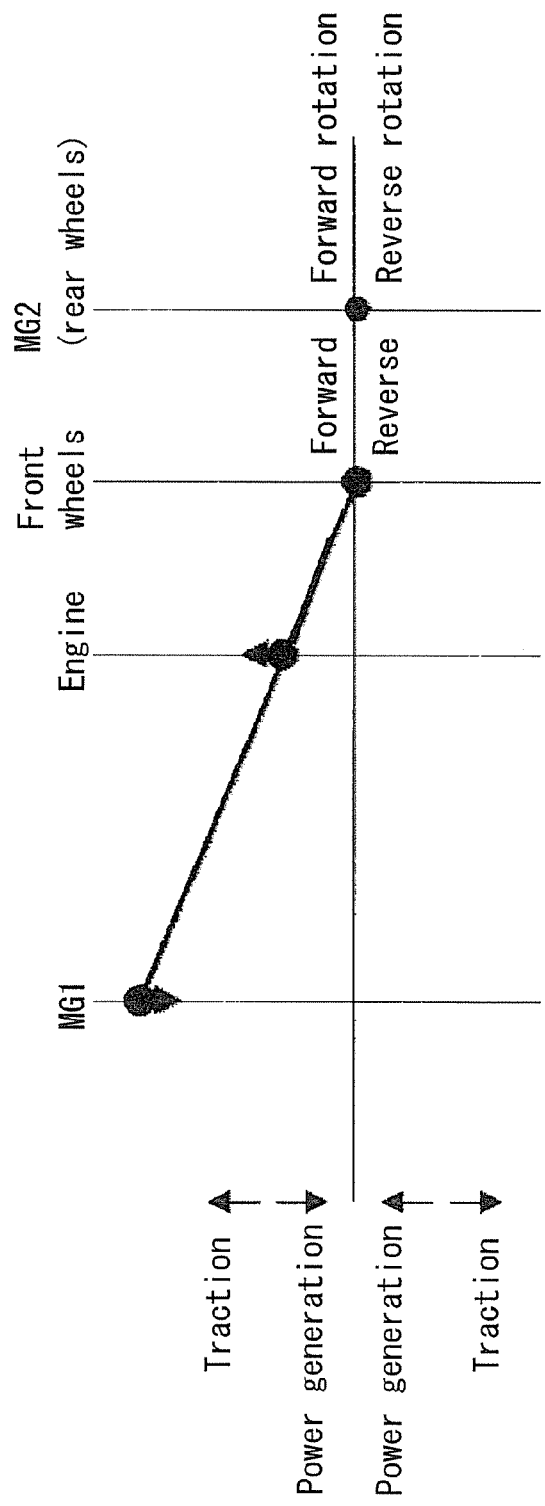
FIG. 5 illustrates a table (upper side) indicating each operating state of the engine and the motors, and a nomographic chart (lower side) at a time of power regeneration of the vehicle according to the first embodiment of the present invention.

As illustrated in FIG. 5, when the engine is driven while the front and rear wheels are locked such as by a braking operation, a power generation mode is achieved at the MG1 for generating electricity. The locked state of each of the front and rear wheels 13 and 15 is achieved by, instead of the braking operation, controlling the MG2 so that the equal level of driving force (i.e., reverse driving force) to that applied to the front wheels 13 (i.e., forward driving force) is generated at the rear wheels 15.

Figure 6A:
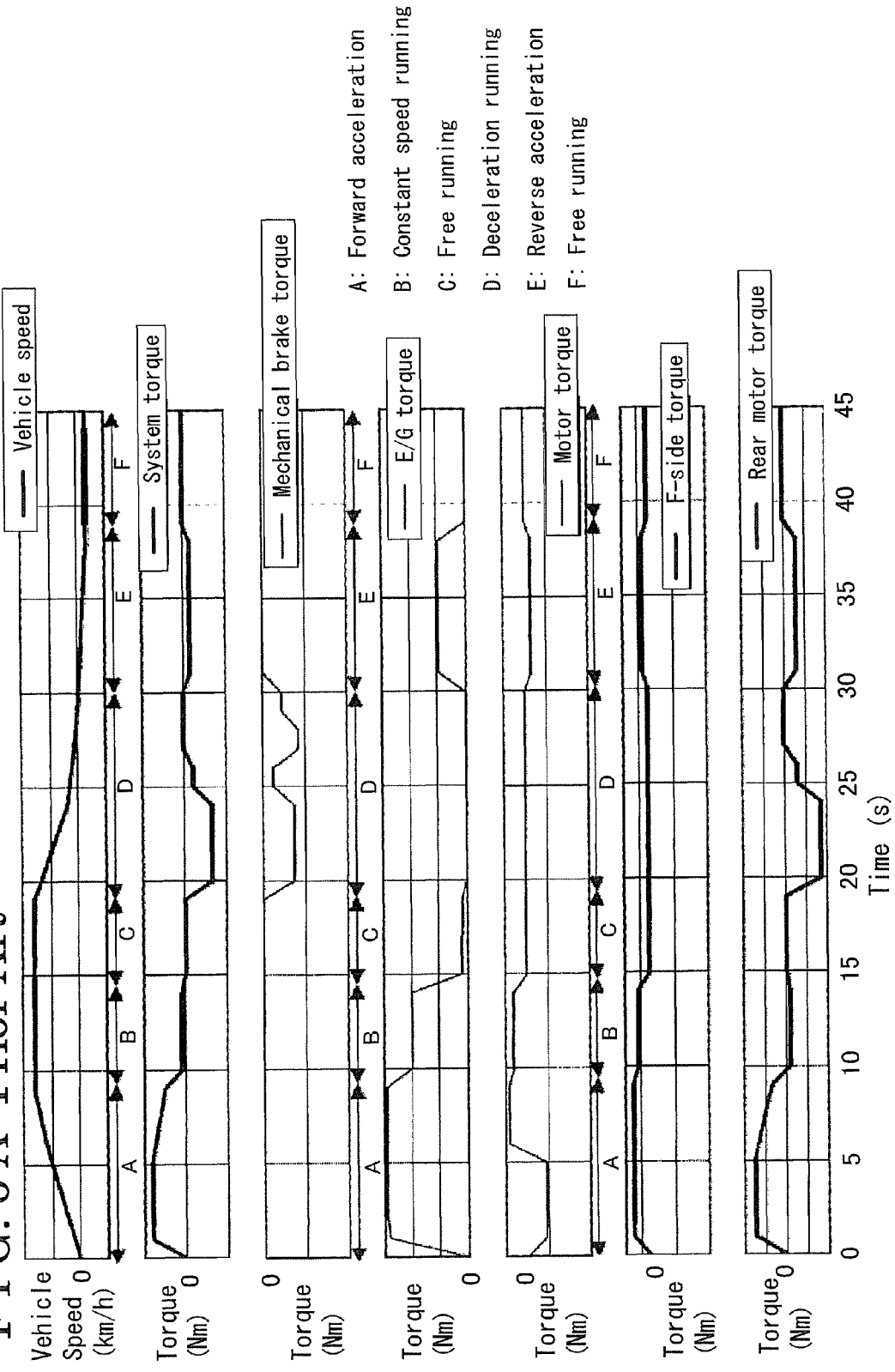
Figure 7B:
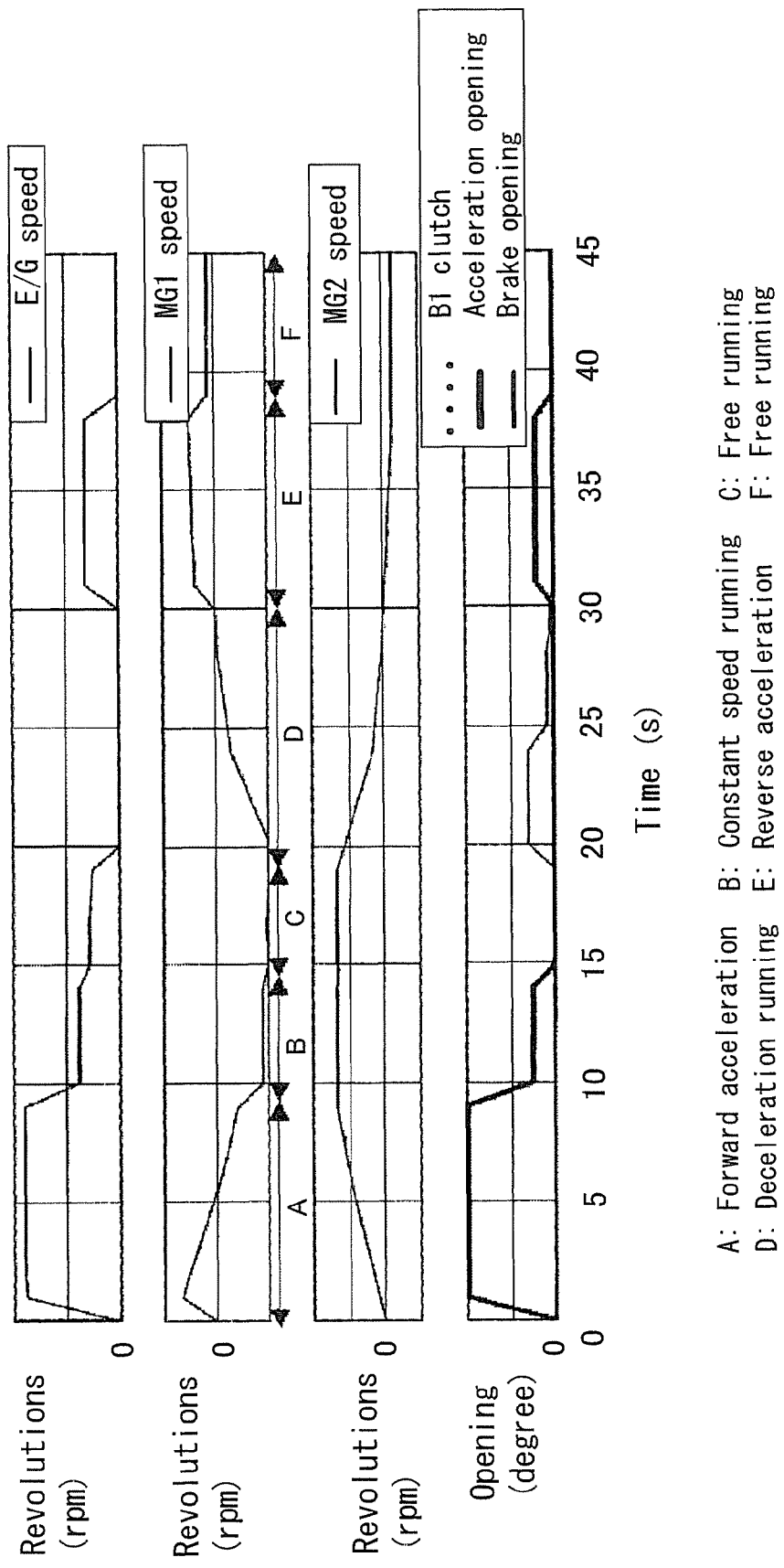

FIGS. 6A and 6B each illustrate a state transition of each portion of a four-wheel-drive vehicle disclosed in JP2005178479A (Reference 1) in cases where the vehicle runs in a predetermined pattern of forward acceleration, constant running, stop, and reverse. FIGS. 7A and 7B each illustrate a state transition of each portion of the vehicle having the drive system according to the first embodiment in cases where the vehicle runs in the same pattern as that in FIGS. 6A and 6B. Even though the drive system according to the first embodiment has a light and simple structure with one less number of motors, the running performance is the same between the first embodiment and the Reference 1.

Figure 8:
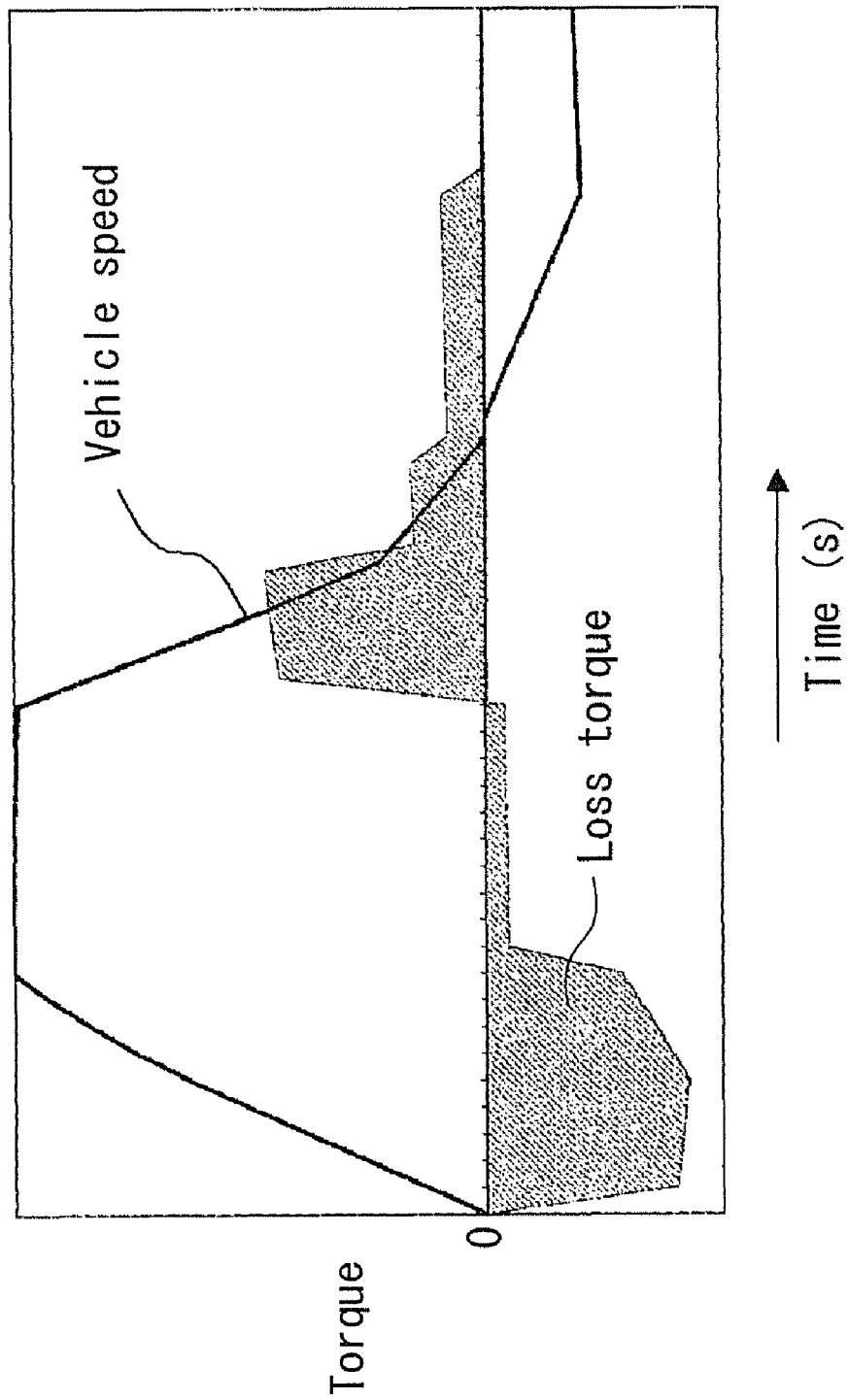
FIG. 8 is a graph explaining a loss torque caused by the four-wheel-drive feature according to the conventional drive system for a vehicle.

In addition, as illustrated in FIG. 8, in cases where a two-wheel-drive mode is selected in the four-wheel-drive vehicle in Reference 1 while the vehicle is running from the forward acceleration mode to the constant speed running mode, a motor that is connected to a ring gear serving as an output element of a power distribution mechanism or a motor that is connected to rear wheels are brought to rotate in association with rotations of driving wheels, i.e., running of the vehicle, thereby causing loss energy (loss torque). On the other hand, according to the first embodiment, a drive gear that is driven by the motor is not arranged at a side of the driving wheels including the ring gear 5 and thus the motor is prevented from rotating at the time of forward acceleration and the constant speed running. As a result, the fuel consumption is further enhanced.

Second Embodiment

Figure 9:
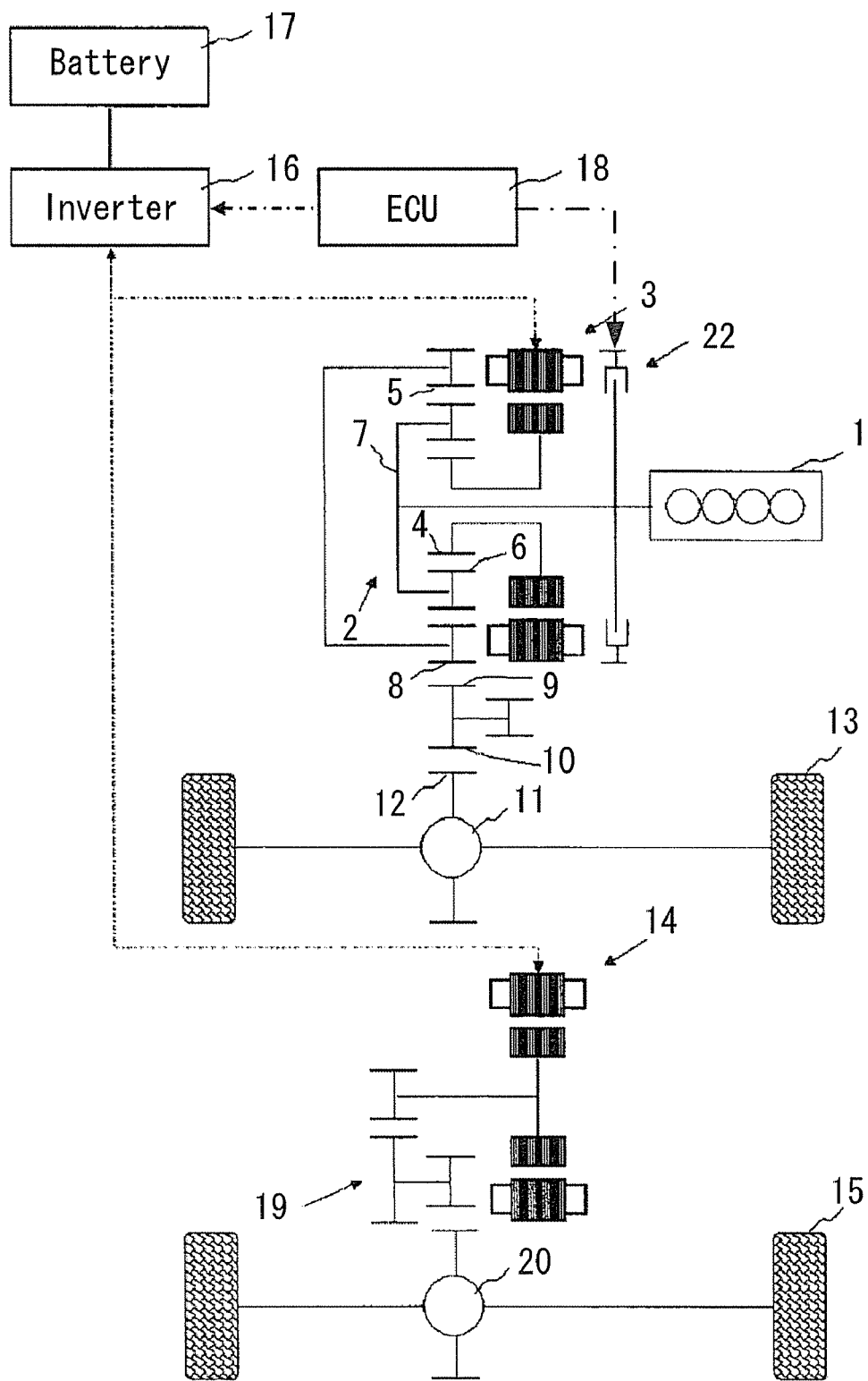
FIG. 9 is a structural view of a drive system for a vehicle according to a second embodiment of the present invention.

A second embodiment of the present invention will be explained below. FIG. 9 is a structural view illustrating the drive system for a vehicle according to the second embodiment. A different point of the second embodiment from the first embodiment is that a brake apparatus 22 is provided at the output shaft of the internal combustion engine 1 so as to stop revolutions of the output shaft. In the followings, the running mode achieved by the brake apparatus 22 will be explained.

Figure 10:
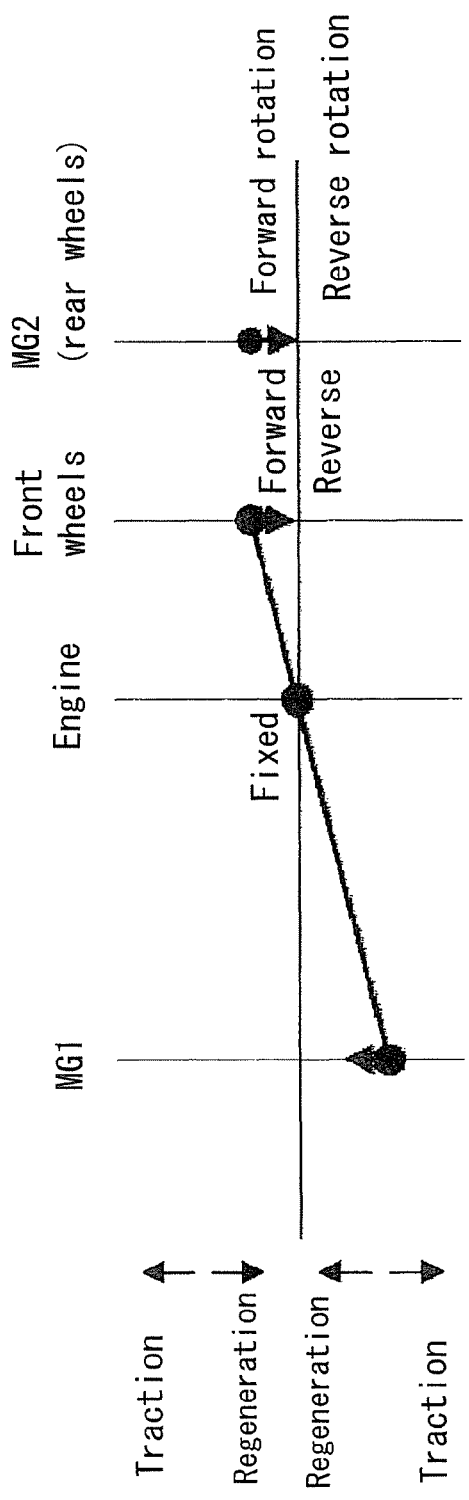
FIG. 10 illustrates a table (upper side) indicating each operating state of the engine and the motors, and a nomographic chart (lower side) at a time of deceleration running (regeneration) of the vehicle according to the second embodiment of the present invention.

FIG. 10 illustrates a table indicating each operating state of the engine, MG1, and MG2 (upper side), and a nomographic chart (lower side) at a time of deceleration running (i.e., regeneration) of the vehicle. As illustrated in FIG. 10, when the vehicle is in the deceleration running mode, not only the energy regeneration at the MG2 but also the energy regeneration at the MG1 is performed by means of a fixation of the output shaft of the internal combustion engine 1 that is achieved by an operation of the brake apparatus 22.

Figure 11:
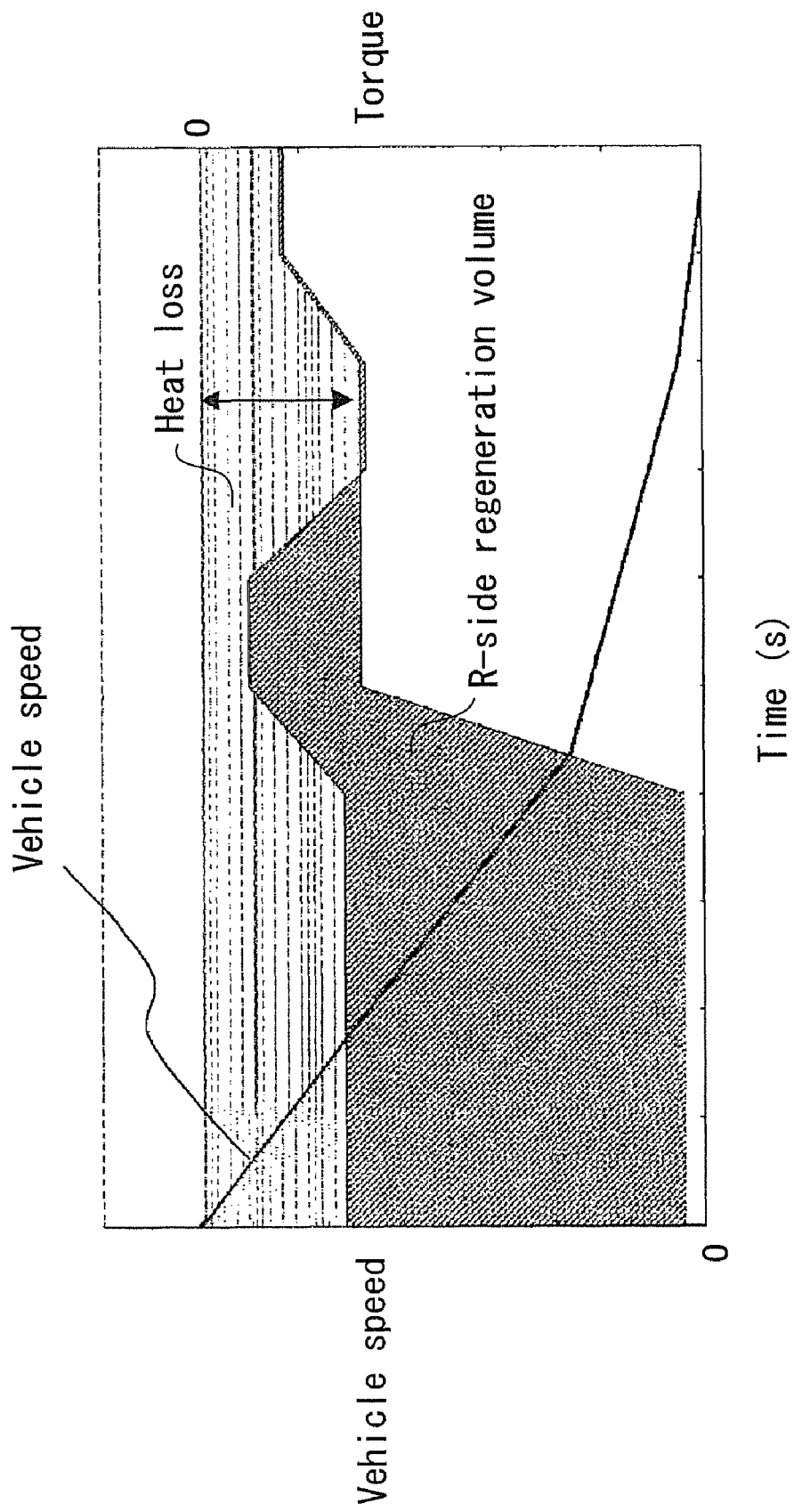
FIG. 11 is a graph explaining a regeneration volume at a time of deceleration by the four-drive-wheel feature according to the conventional drive system.

FIG. 11 is a graph illustrating a relationship between a vehicle speed, a mechanical brake torque, and a rear-side (R-side) torque in the deceleration running mode of the four-wheel-drive vehicle in the Reference 1. A predetermined volume of a kinetic energy of the vehicle at a time of deceleration is regenerated at the MG2 connected to the rear wheels 15. However, a portion of the kinetic energy over the predetermined volume results in a heat loss (equivalent to mechanical brake torque).

Figure 13:
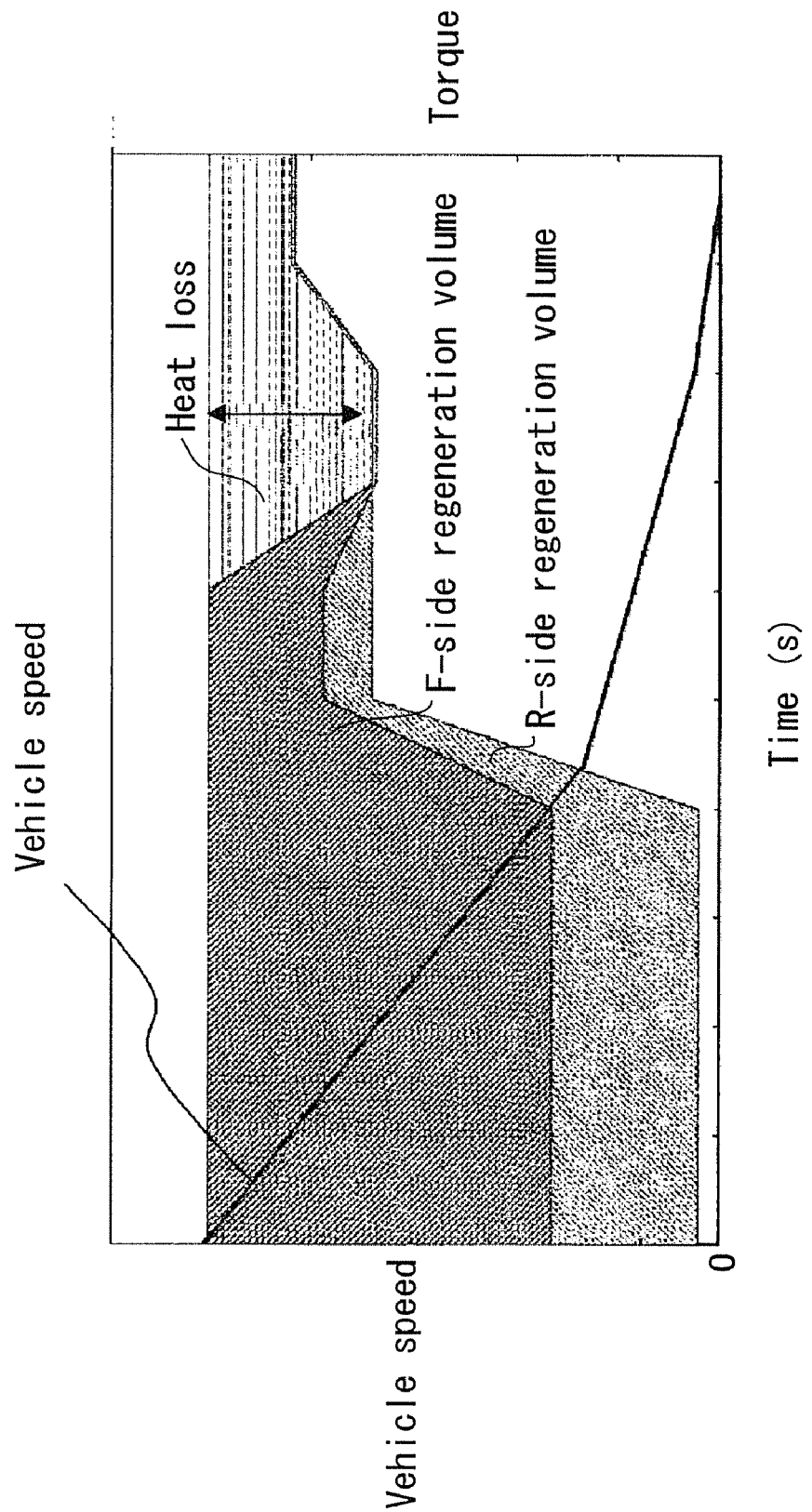
FIG. 13 is a graph explaining a regeneration volume at a time of deceleration according to the drive system for a vehicle according to the second embodiment.

FIGS. 12A and 12B each illustrate a state transition of each portion of the vehicle equipped with the drive system according to the second embodiment in cases where the vehicle runs in the same pattern as that illustrated in FIGS. 6A and 6B. FIG. 13 is a graph illustrating a relationship between a mechanical brake torque and a rear-side (R-side) torque in the deceleration running mode of the vehicle according to the second embodiment. According to the structure of the drive system of the second embodiment, the brake apparatus 22 is operated to thereby achieve the regeneration of all the kinetic energy of the vehicle in the deceleration mode at the MG1 and the MG2.

Third Embodiment

A third embodiment having an additional running mode with the same structure as that of the second embodiment will be explained below.

Figure 14:
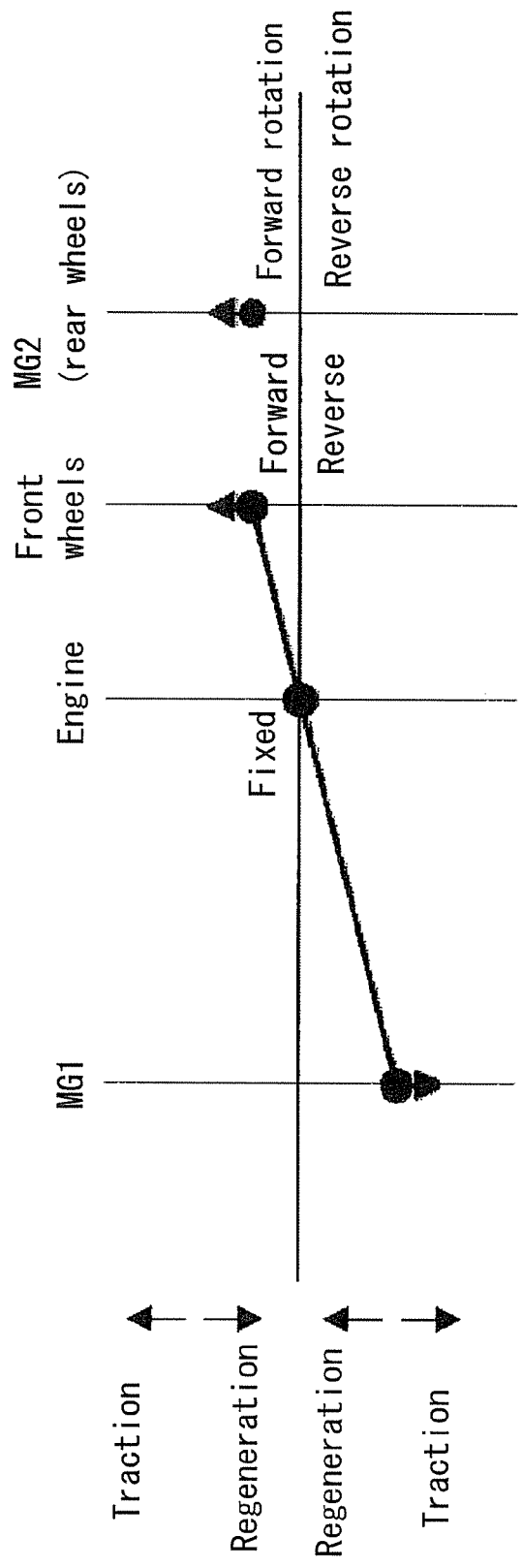
FIG. 14 illustrates a table (upper side) indicating each operating state of the engine and the motors, and a nomographic chart (lower side) at a time of MG forward running of the vehicle according to a third embodiment of the present invention.

The drive system for a vehicle according to the third embodiment also includes the brake apparatus 22. Thus, a motor start-up (i.e., MG start-up) without a usage of the driving force of the internal combustion engine 1 is possible. FIG. 14 illustrates a table indicating each operating state of the engine, MG1, and MG2 (upper side), and a nomographic chart (lower side) at a time of MG forward running of the vehicle. As illustrated in FIG. 14, both of the MG1 and MG2 are in the traction mode to thereby drive the front wheels 13 and the rear wheels 15 each in the forward direction.

FIGS. 15A and 15B each illustrate a state transition of each portion of the vehicle equipped with the drive system according to the third embodiment in cases where the vehicle runs in the same pattern as that illustrated in FIGS. 6A and 6B. A different point of FIGS. 15A and 15B from FIGS. 12A and 12B is that the brake apparatus 22 is operated and the MG1 is in the traction mode even in the forward acceleration running mode of the vehicle (see "B1 clutch" shown by a dotted line at a bottom in FIG. 15B).

Figure 16:
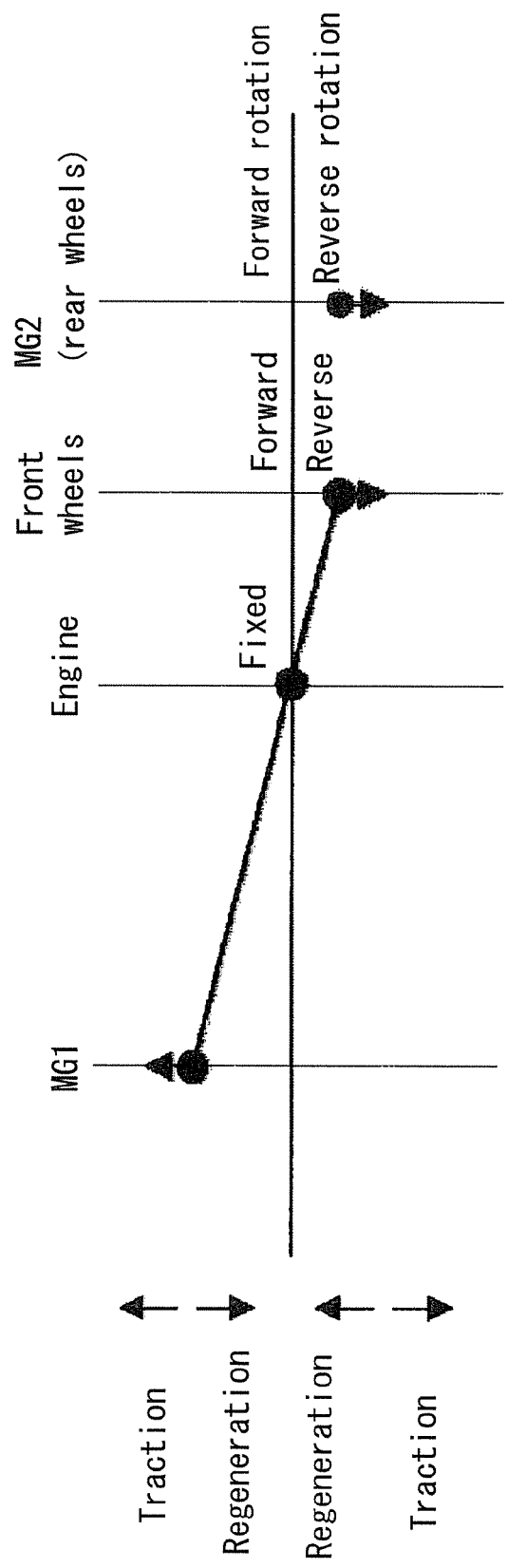
FIG. 16 illustrates a table (upper side) indicating each operating state of the engine and the motors, and a nomographic chart (lower side) at a time of MG reverse running of the vehicle according to the third embodiment of the present invention.

In the same way, the rearward start-up without a usage of the driving force of the internal combustion engine 1 is also possible. FIG. 16 illustrates a table indicating each operating state of the engine, MG1, and MG2 (upper side), and a nomographic chart (lower side) at a time of MG rearward running of the vehicle. As illustrated in FIG. 16, the MG1 and the MG2 rotate in directions opposite to each other so that the front wheels 13 and the rear wheels 15 are each driven to rotate in the rearward direction.

Figure 17:
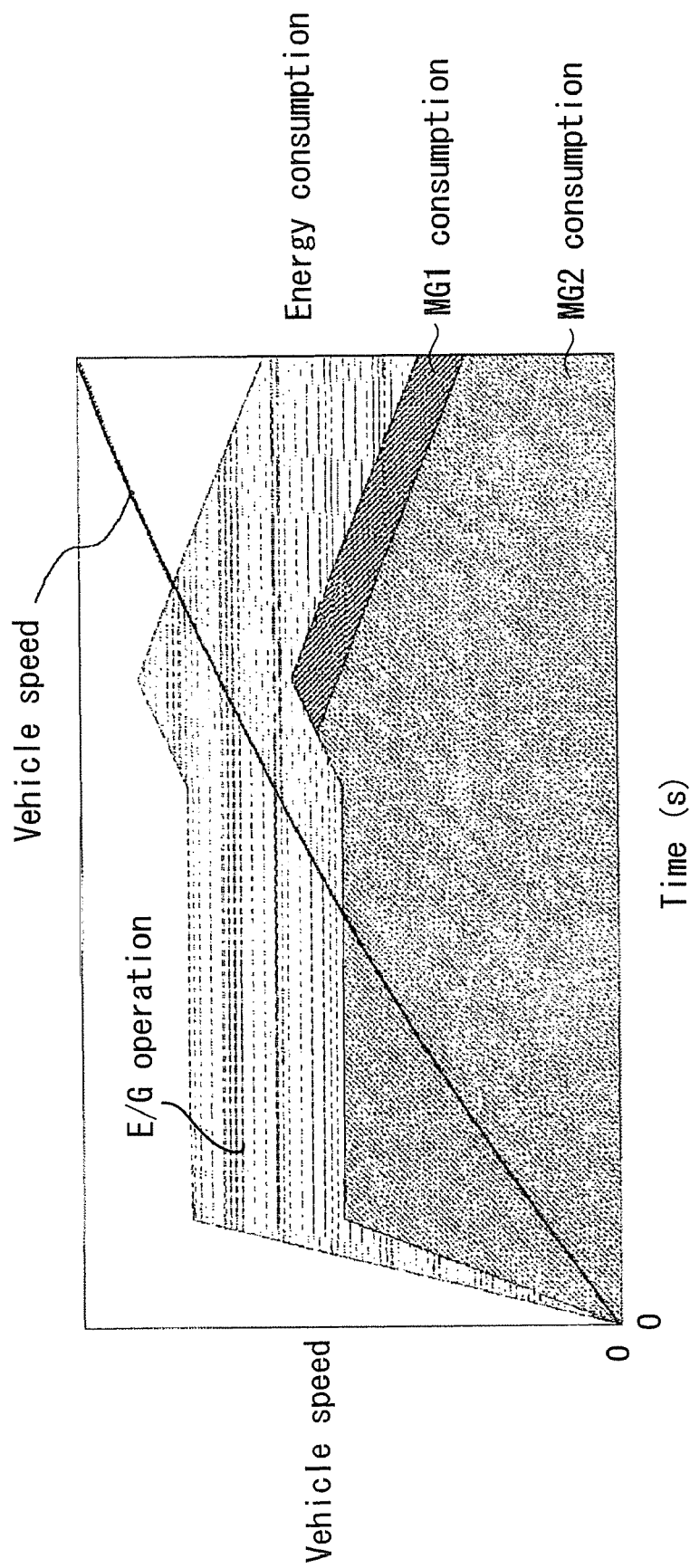
FIG. 17 is a graph explaining a fuel consumption energy at a time of start-up caused by the four-wheel-drive feature according to the conventional drive system for a vehicle.
Figure 18:
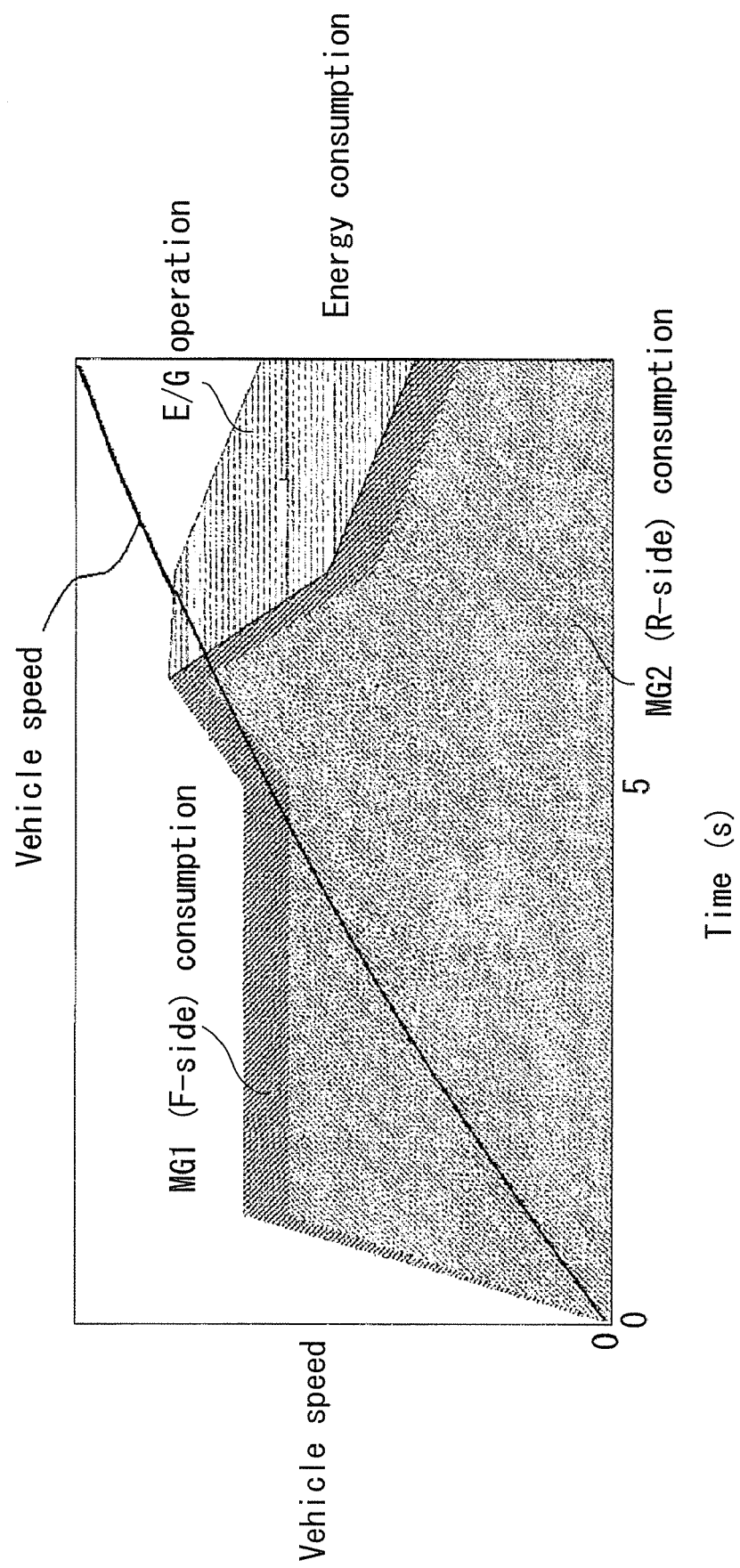
FIG. 18 is a graph explaining a fuel consumption energy at a time of start-up according to the third embodiment of the present invention.

FIG. 17 is a graph illustrating energy consumption in the forward acceleration running mode of the four-wheel-drive vehicle according to the Reference 1. FIG. 18 is a graph illustrating energy consumption in the forward acceleration running mode of the vehicle equipped with the drive system according to the third embodiment. As is clearly understood from a comparison between FIGS. 17 and 18, the energy consumption in the forward acceleration running mode of the vehicle according to the third embodiment can be covered by the battery consumption to thereby further enhance the fuel consumption of the vehicle.

According to the third embodiment in which the motor start-up (MG start-up) is possible without a usage of the driving force of the internal combustion engine 1, the fuel consumption in the forward acceleration running mode can be reduced.

Fourth Embodiment

Figure 19:
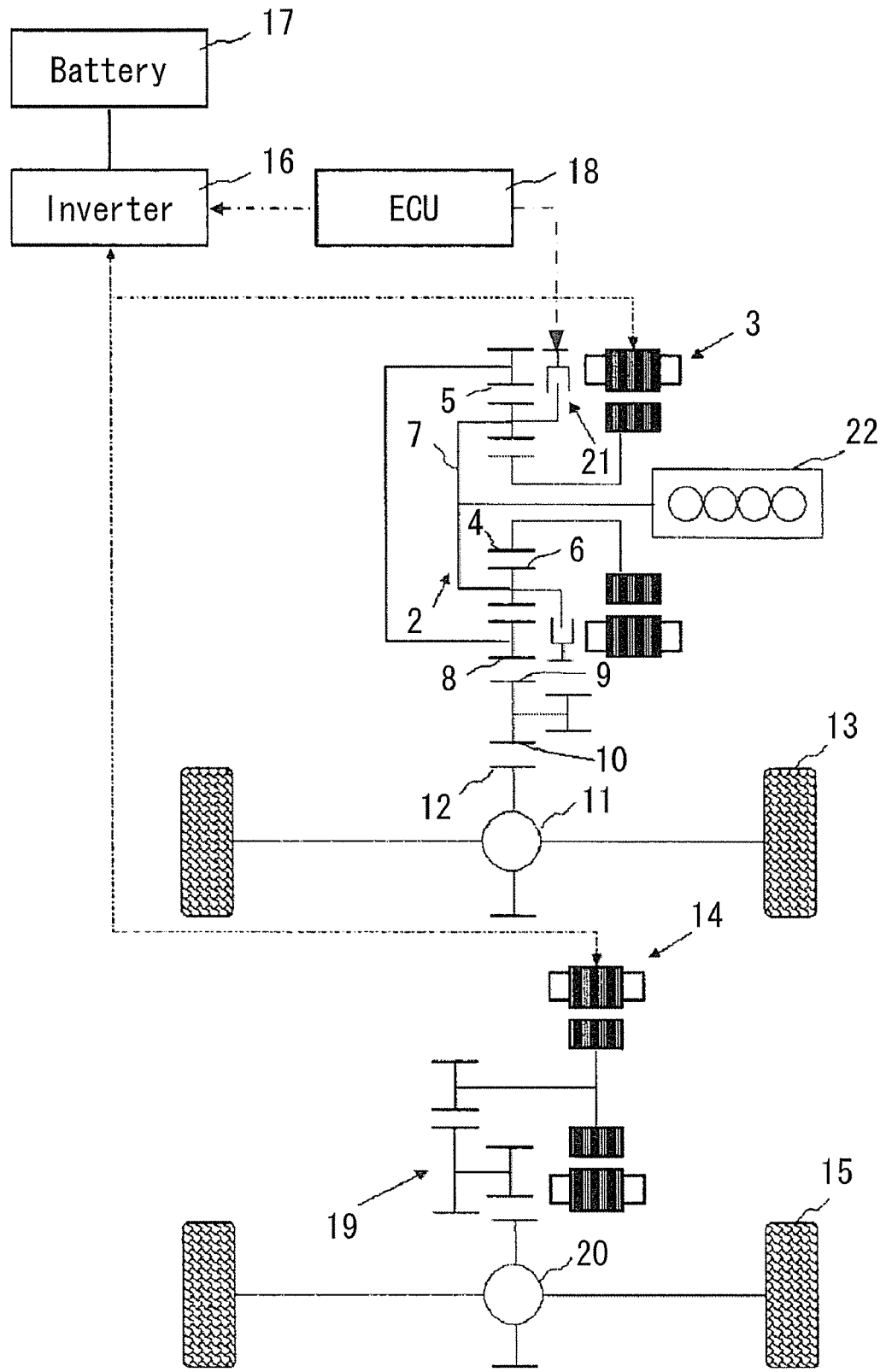
FIG. 19 is a structural view of the drive system according to a fourth embodiment of the present invention.

A fourth embodiment obtained by an addition of structural changes to the second embodiment will be explained below. FIG. 19 is a structural view of the drive system for a vehicle according to the fourth embodiment. A different point of the fourth embodiment from the second embodiment is that a brake apparatus 21 is arranged at the carrier 7 instead of the output shaft of the internal combustion engine 1 so as to lock the carrier 7.

According to a structure of the fourth embodiment, the same running mode as that of the second or third embodiment is achieved. In addition, the brake apparatus 21 can be mounted inside of the carrier 7 to thereby achieve a simple structure of the drive system.

The first to fourth embodiments are achieved in the aforementioned manner. However, the present invention is not limited to the aforementioned embodiments and can be modified. That is, as long as a motor is prevented from being connected to the power distribution mechanism 2 and one of the front wheels 13 and the rear wheels 15 (i.e., first driving wheels), and the internal combustion engine 1 is controlled with consideration of a torque exchanged between the front wheels 13 and the rear wheels 15 and between the power distribution mechanism 2 and the other one of the front wheels 13 and the rear wheels 15 (i.e., second driving wheels), in response to the operating state of the motor connected to the second driving wheels and the running state of the vehicle, the drive system for a vehicle may be modified.

Figure 20:
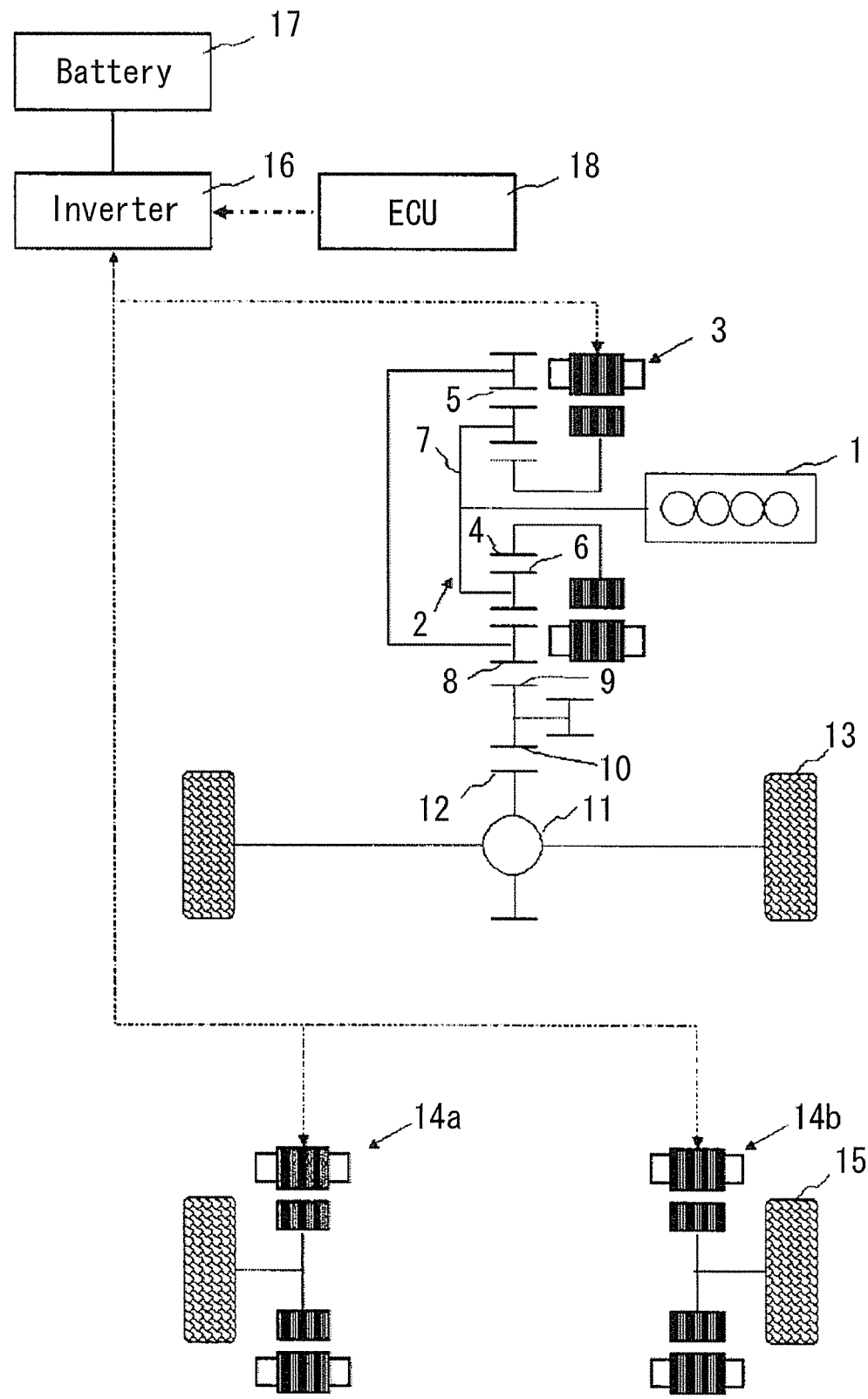
FIG. 20 is a modified structural view of the drive system for a vehicle according to the first embodiment of the present invention.
Figure 21:
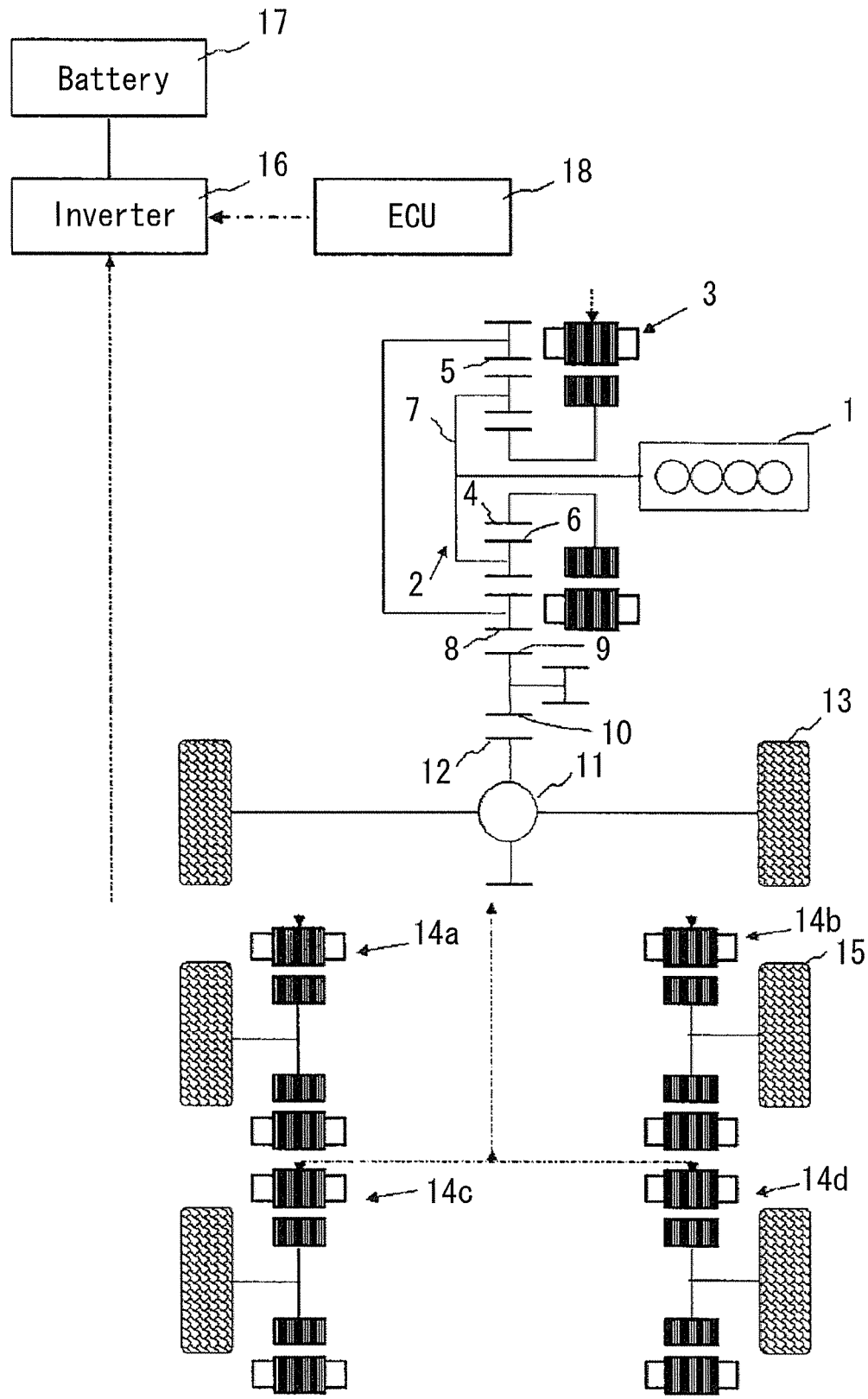
FIG. 21 is another modified structural view of the drive system for a vehicle according to the first embodiment of the present invention.

FIG. 20 is a structural view of the drive system in which the motor generator 14 connected to the rear wheels 15 according to the first embodiment is replaced by in-wheel motors 14a and 14b. FIG. 21 is a structural view of the drive system for a 6 axes (multi-axle) all-wheel-drive vehicle using in-wheel motors 14c and 14d in addition to the aforementioned in-wheel motors 14a and 14b. According to such structure, the excellent driving ability and fuel consumption can be achieved by an application of the control same as that according to the first embodiment. Further, the brake apparatus according to the second or fourth embodiment can be added to such structure.

Figure 23:
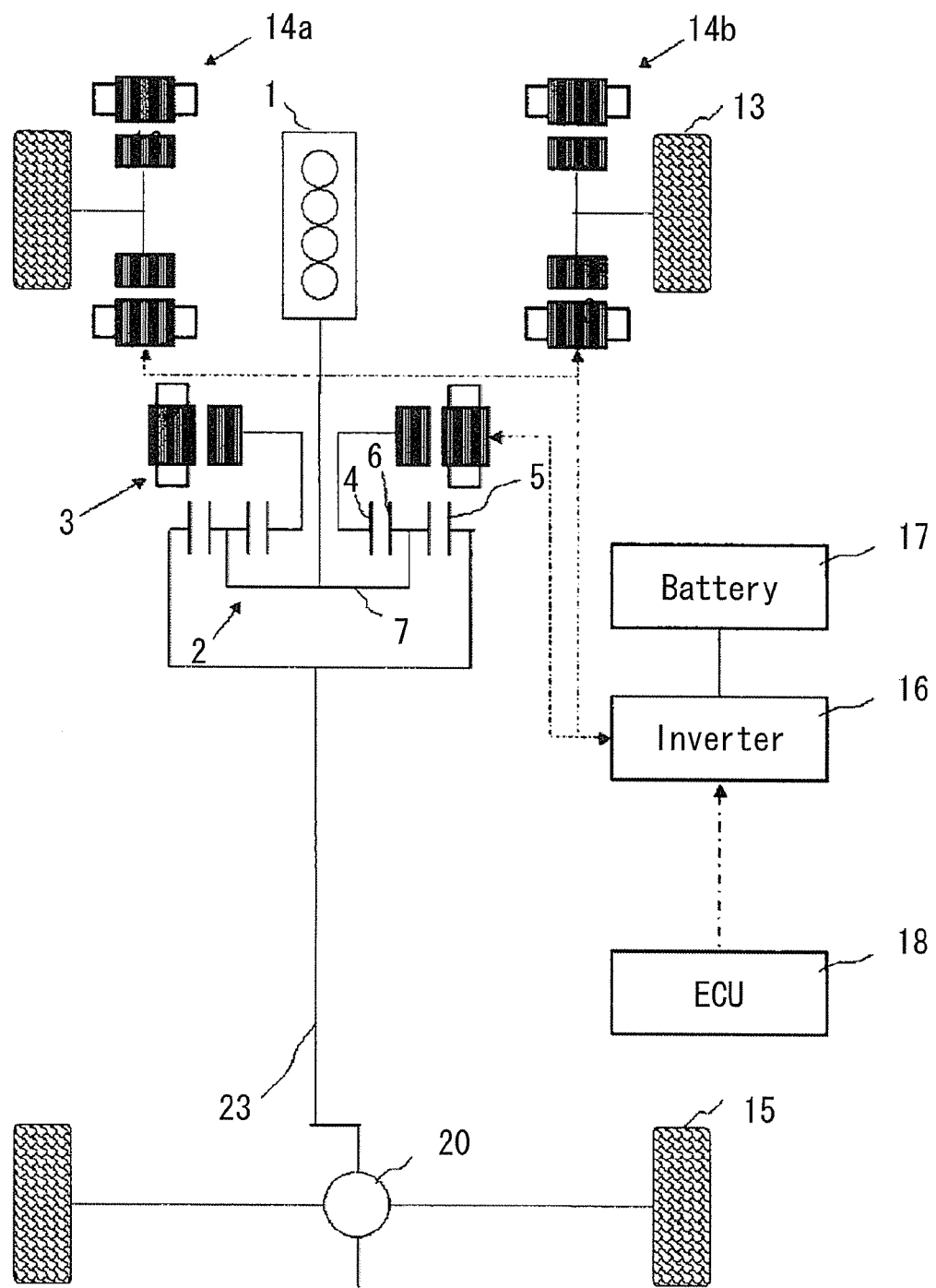
FIG. 23 is still another modified structural view of the drive system for a vehicle.

FIG. 22 is a structural view of the drive system applied to a front-engine/rear-drive vehicle (FR vehicle). According to a structure illustrated in FIG. 22, the ring gear 5 is connected to an output shaft 23 (propeller shaft) that is connected to the rear differential 20. In addition, the motor generator 14 is connected to the front wheels 13 via the deceleration gear unit 19. FIG. 23 is a structural view in which the motor generator 14 connected to the front wheels 13 is replaced by the in-wheel motors 14a and 14b. According to such structure, the number of motor generators is less as compared to the Reference 1 and further the engine can be longitudinally arranged so that excellent mounting ability is achieved.

According to the aforementioned embodiments, the four-wheel-drive running is achieved with one motor and one generator. In addition, the energy loss (loss torque) is reduced. This is because the ring gear 5 and gears such as the output gear 8 and the counter driven gear 9 arranged between the ring gear 5 and the front wheels 13 each function as a driven member which are driven by the internal combustion engine 1, and the exchange of torque of the motor generator 14 that is not mechanically connected to the power distribution mechanism 2 is made with the front wheels 13.

According to the aforementioned embodiments, the power distribution mechanism 2 is constituted by the planetary gear mechanism including the sun gear 4 serving as an input element to the motor generator 3, the ring gear 5 serving as an output element to the front wheels 13, and the pinion gear 6 moving around the sun gear 4 and rotating on its axis by means of the carrier 7 connected to the output shaft of the internal combustion engine 1, and the ring gear 5 and the gears arranged between the ring gear 5 and the front wheels 13 each serve as a driven gear.

In addition, the drive system includes the brake apparatus 22 for preventing revolutions of the output shaft of the internal combustion engine 1, wherein the electronic control unit 8 controls the brake apparatus 22 when the vehicle is in the deceleration running mode, and the power distribution mechanism 2 causes revolutions of the motor generator 3 to increase by means of an operation of the brake apparatus 22.

Further, the electronic control unit 8 controls to drive the motor generator 3 by bringing the brake apparatus 22 to be in an engagement state so as to start the vehicle.

Furthermore, the motor 14 is equal to the in-wheel motor 14a or 14b.

Furthermore, the drive system includes the brake apparatus 21 for preventing revolutions of the career 7 of the planetary gear mechanism, the brake apparatus 21 being operated by the electronic control unit 8 when the vehicle is in the deceleration running mode, and the power distribution mechanism 2 causes revolutions of the motor generator 3 to increase by means of an operation of the brake apparatus 21.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A drive system for a vehicle comprising:
   a motor;
   an internal combustion engine;
   a generator;
   a power distribution mechanism distributing a driving force of the internal combustion engine to driving wheels and the generator;
   an electronic control unit controlling the motor and the internal combustion engine;
   and rotation members connected to first driving wheels constituted by one of front wheels and rear wheels and including an output element of the power distribution mechanism;
   wherein the internal combustion engine driving the first driving wheels via the power distribution mechanism, the motor driving second driving wheels not driven by the internal combustion engine, and the rotation members being driven by the internal combustion engine; and
   wherein the power distribution mechanism is constituted by a planetary gear mechanism including a sun gear serving as an input element to the generator, a ring gear serving as an output element to the first driving wheels, and a pinion gear moving around the sun gear and rotating on its axis by means of a carrier connected to an output shaft of the internal combustion engine, and the ring gear and a gear arranged between the ring gear and the first driving wheels each serve as a driven gear driven by the internal combustion engine.

2. A drive system for a vehicle according to claim 1, further comprising a brake apparatus for preventing revolutions of the carrier of the planetary gear mechanism, the brake apparatus being operated by the electronic control unit when the vehicle is in a deceleration running mode, and the power distribution mechanism causes revolutions of the generator to increase by operation of the brake apparatus.

3. A drive system for a vehicle according to claim 2, wherein the generator is equal to a motor generator, and the electronic control unit controls to drive the motor generator by bringing the brake apparatus to be in an engagement state so as to start the vehicle.

4. A drive system for a vehicle according to claim 3, wherein the motor is equal to an in-wheel motor.

5. A drive system for a vehicle according to claim 2, wherein the motor is equal to an in-wheel motor.

6. A drive system for a vehicle according to claim 1, wherein the motor is equal to an in-wheel motor.

7. A drive system for a vehicle comprising
a motor;
an internal combustion engine;
a generator;
a power distribution mechanism distributing a driving force of the internal combustion engine to driving wheels and the generator;
an electronic control unit controlling the motor and the internal combustion engine;
and rotation members connected to first driving wheels constituted by one of front wheels and rear wheels and including an output element of the power distribution mechanism;
wherein the internal combustion engine driving the first driving wheels via the power distribution mechanism, the motor driving second driving wheels not driven by the internal combustion engine, and the rotation members being driven by the internal combustion engine; and
a brake apparatus for preventing revolutions of an output shaft of the internal combustion engine, wherein the electronic control unit controls the brake apparatus when the vehicle is in a deceleration running mode, and the power distribution mechanism causes revolutions of the generator to increase by operation of the brake apparatus.

8. A drive system for a vehicle according to claim 7, wherein the generator is equal to a motor generator, and the electronic control unit controls to drive the motor generator by bringing the brake apparatus to be in an engagement state so as to start the vehicle.

9. A drive system for a vehicle according to claim 8, wherein the motor is equal to an in-wheel motor.

10. A drive system for a vehicle according to claim 7, wherein the motor is equal to an in-wheel motor.

11. A drive system for a vehicle comprising:
a motor;
an internal combustion engine;
a generator;
a power distribution mechanism distributing a driving force of the internal combustion engine to driving wheels and the generator;
an electronic control unit controlling the motor and the internal combustion engine;
and rotation members connected to first driving wheels constituted by one of front wheels and rear wheels and including an output element of the power distribution mechanism;
wherein the internal combustion engine drives the first driving wheels via the power distribution mechanism, the motor drives second driving wheels not driven by the internal combustion engine, and the rotation members are driven by the internal combustion engine; and
when the motor is in a traction state rotating in a reverse direction to thereby drive the second driving wheels in the reverse direction, the electronic control unit controls the internal combustion engine to increase rotation number of the internal combustion engine so that the driving force applied to the second driving wheels exceeds the driving force applied to the first driving wheels.

12. A drive system for a vehicle according to claim 11, further comprising a brake apparatus for preventing revolutions of an output shaft of the internal combustion engine, wherein the electronic control unit controls the brake apparatus when the vehicle is in a deceleration running mode, and the power distribution mechanism causes revolutions of the generator to increase by operation of the brake apparatus.

* * * * *